(12) United States Patent
Kobayashi et al.

(10) Patent No.: US 10,074,165 B2
(45) Date of Patent: Sep. 11, 2018

(54) IMAGE COMPOSITION DEVICE, IMAGE COMPOSITION METHOD, AND RECORDING MEDIUM

(71) Applicant: MORPHO, INC., Chiyoda-ku, Tokyo (JP)

(72) Inventors: Michihiro Kobayashi, Tokyo (JP); Kouta Kurihara, Tokyo (JP); Ryo Ono, Tokyo (JP)

(73) Assignee: MORPHO, INC., Tokyo (JP)

( * ) Notice: Subject to any disclaimer, the term of this patent is extended or adjusted under 35 U.S.C. 154(b) by 85 days.

(21) Appl. No.: 14/848,751

(22) Filed: Sep. 9, 2015

(65) Prior Publication Data

US 2016/0071289 A1    Mar. 10, 2016

(30) Foreign Application Priority Data

Sep. 10, 2014  (JP) ................. 2014-184017

(51) Int. Cl.
| | |
|---|---|
| G06T 5/00 | (2006.01) |
| G06T 5/50 | (2006.01) |
| H04N 1/387 | (2006.01) |
| H04N 1/60 | (2006.01) |

(52) U.S. Cl.
CPC .............. *G06T 5/50* (2013.01); *H04N 1/3871* (2013.01); *H04N 1/6086* (2013.01); *G06T 2207/10024* (2013.01); *G06T 2207/10152* (2013.01); *G06T 2207/20221* (2013.01)

(58) Field of Classification Search
CPC ............................ H04N 1/3871; H04N 1/6086
See application file for complete search history.

(56) References Cited

U.S. PATENT DOCUMENTS

| | | | | |
|---|---|---|---|---|
| 7,545,967 | B1* | 6/2009 | Prince | G06T 5/50 |
| | | | | 128/920 |
| 9,253,460 | B1* | 2/2016 | Wang | H04N 9/735 |
| 9,299,189 | B1* | 3/2016 | Chater | |
| 2001/0022860 | A1* | 9/2001 | Kitamura | H04N 1/40 |
| | | | | 382/284 |

(Continued)

FOREIGN PATENT DOCUMENTS

| | | |
|---|---|---|
| CN | 101390384 A | 3/2009 |
| CN | 102387372 A | 3/2012 |

(Continued)

OTHER PUBLICATIONS

Communication dated Jul. 26, 2016, from the Japanese Patent Office in counterpart application No. 2015-178258.

(Continued)

*Primary Examiner* — Sean Motsinger
(74) *Attorney, Agent, or Firm* — Sughrue Mion, PLLC

(57) ABSTRACT

An image composition device composites a no-flash image including a subject captured under ambient light and a flash image including the subject captured by emitting flash light to generate a composite image including the subject. The image composition device includes an input unit that enables the no-flash image and the flash image to be input, a correction unit that corrects the no-flash image and the flash image input from the input unit, and a composition unit that composites the no-flash image and the flash image output from the correction unit to generate a composite image. The correction unit corrects a color temperature of the no-flash image.

20 Claims, 21 Drawing Sheets

(56) References Cited

U.S. PATENT DOCUMENTS

| | | | | |
|---|---|---|---|---|
| 2006/0050335 A1* | 3/2006 | Dorrell | | H04N 1/6086 |
| | | | | 358/516 |
| 2007/0132858 A1* | 6/2007 | Chiba | | H04N 1/58 |
| | | | | 348/222.1 |
| 2007/0201853 A1* | 8/2007 | Petschnigg | | G03B 15/03 |
| | | | | 396/155 |
| 2008/0037081 A1* | 2/2008 | Shibamiya | | H04N 1/00217 |
| | | | | 358/540 |
| 2008/0187235 A1* | 8/2008 | Wakazono | | H04N 5/243 |
| | | | | 382/255 |
| 2009/0174795 A1* | 7/2009 | Kato | | H04N 5/23222 |
| | | | | 348/234 |
| 2010/0026823 A1* | 2/2010 | Sawada | | G03B 7/28 |
| | | | | 348/222.1 |
| 2010/0195929 A1* | 8/2010 | Inoue | | H04N 21/8153 |
| | | | | 382/274 |
| 2010/0289962 A1 | 11/2010 | Kim et al. | | |
| 2011/0243404 A1* | 10/2011 | Li | | G06T 11/008 |
| | | | | 382/128 |
| 2011/0254976 A1* | 10/2011 | Garten | | G06F 3/1454 |
| | | | | 348/229.1 |
| 2012/0057045 A1* | 3/2012 | Shimizu | | H04N 9/735 |
| | | | | 348/223.1 |
| 2012/0188403 A1* | 7/2012 | Gomita | | H04N 5/2354 |
| | | | | 348/226.1 |
| 2012/0281110 A1* | 11/2012 | Ogawa | | H04N 5/23229 |
| | | | | 348/224.1 |
| 2014/0015933 A1* | 1/2014 | Sato | | G02B 21/365 |
| | | | | 348/46 |
| 2014/0036106 A1* | 2/2014 | Ouchi | | H04N 9/735 |
| | | | | 348/224.1 |
| 2015/0054985 A1* | 2/2015 | Baek | | H04N 5/23293 |
| | | | | 348/231.99 |
| 2016/0093029 A1* | 3/2016 | Micovic | | H04N 5/2355 |
| | | | | 348/229.1 |

FOREIGN PATENT DOCUMENTS

| | | |
|---|---|---|
| CN | 103581638 A | 2/2014 |
| JP | 2003153287 A | 5/2003 |
| JP | 2009060586 A | 3/2009 |
| JP | 2010114708 A | 5/2010 |
| JP | 2012050121 A | 3/2012 |
| JP | 2012235377 A | 11/2012 |
| JP | 2014033276 A | 2/2014 |

OTHER PUBLICATIONS

Communication dated Dec. 20, 2017 from the State Intellectual Property Office of the P.R.C. In counterpart Application No. 201510575356.2.

* cited by examiner

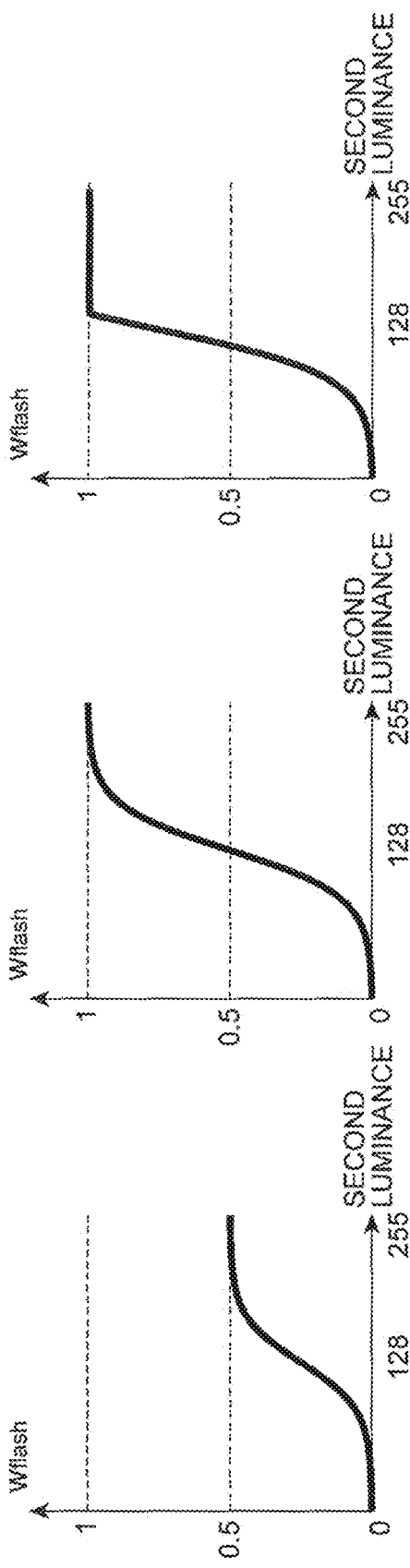

IMAGE COMPOSITION DEVICE, IMAGE COMPOSITION METHOD, AND RECORDING MEDIUM

BACKGROUND

Field of Invention

An aspect of the present invention relates to an image composition device, an image composition method and a recording medium.

Background Arts

Conventionally, techniques that enable photography of both a night view and a subject in a preferable state are known. A photographing device of Patent Literature 1 (Patent Literature 1: Japanese Patent Application Laid-open No. 2003-153287) composites a first image photographed with an exposure of a prescribed time while turning off a photographic light source with a second image photographed using the photographic light source after the exposure. An imaging device of Patent Literature 2 (Patent Literature 2: Japanese Patent Application Laid-open No. 2012-50121) photographs a night view under a first exposure. Subsequently, the imaging device photographs a subject under a second exposure that involves emitting a flash.

SUMMARY OF INVENTION

When compositing two images captured under different light environment conditions, depending on a relationship between pixel values constituting the images, a preferable composite image may not be obtained. In consideration thereof, in the present technical field, there are demands for an image composition device, an image composition method and a recording medium which enable a preferable composite image to be obtained.

An image composition device in accordance with one aspect of the present invention is an image composition device which generates composite image information including a subject by compositing first image information including the subject captured under a first light environment condition and second image information including the subject captured under a second light environment condition that differs from the first light environment condition, the image composition device including: an input unit that inputs the first image information and the second image information; a correction unit that corrects at least one of the first image information and the second image information input from the input unit; and a composition unit that generates the composite image information by compositing the first image information and the second image information output from the correction unit, wherein the correction unit corrects a color temperature of one of the first image information and the second image information so as to approach a color temperature of the other one of the first image information and the second image information.

When the same subject is captured under different light environment conditions, color temperatures of the respective pieces of image information may differ. When images with different color temperatures are composited, a composite image may exhibit an unnatural tint. In consideration thereof, with the image composition device described above, the correction unit corrects a color temperature of one of the first image information and the second image information so as to approach its color temperature to the other. Subsequently, the composition unit composites the first image information and the second image information having corrected color temperatures. Therefore, the respective color temperatures of the first image information and the second image information to be composited are close to each other. Accordingly, by compositing the first image information and the second image information in this way, a preferable composite image having a natural tint can be obtained.

In one embodiment, the composition unit may include: a difference calculation unit that calculates a difference between a first pixel value of a first composited pixel which constitutes the first image information and a second pixel value of a second composited pixel which constitutes the second image information and corresponds to the first composited pixel; and a composition ratio calculation unit that calculates a composition ratio representing a proportion of the first pixel value to a composite pixel value of a composite pixel which constitutes the composite image information, based on the difference and a composition ratio function, wherein the composition ratio function may define a relationship between the difference and the composition ratio and may include a range in which the composition ratio is larger than 0 and smaller than 1. According to this configuration, the composition unit composites the first pixel value and the second pixel value. A composition ratio of this composition is determined based on a composition ratio function that includes a range in which the composition ratio is larger than 0 and smaller than 1. According to this composition ratio, a composite pixel value is constituted by the first pixel value and the second pixel value. Therefore, the composite pixel value can fall between the first pixel value and the second pixel value. Therefore, in the composite image information, an occurrence of locations where the composite pixel value changes discontinuously may be suppressed, and thereby the composite pixel value may change continuously. As a result, a more preferable composite image can be obtained.

In one embodiment, the composition unit may include: a difference calculation unit that calculates a difference between a first pixel value of a first composited pixel which constitutes the first image information and a second pixel value of a second composited pixel which constitutes the second image information and corresponds to the first composited pixel; and a composition ratio calculation unit that calculates a composition ratio representing a proportion of the first pixel value to a composite pixel value of a composite pixel which constitutes the composite image information, based on at least one of the first pixel value and the second pixel value, the difference, and a composition ratio function, wherein the composition ratio function may include a first function which defines a relationship between the at least one of the first pixel value and the second pixel value and the composition ratio and a second function which corresponds to the difference and weights the first function. Depending on a light environment condition, a difference between the first pixel value and the second pixel value may be small. In this case, the first pixel value and the second pixel value are composited based on a prescribed ratio. When the difference is small, a more preferable composite image may be obtained by compositing with an emphasis on one of the pixel values of the first pixel value and the second pixel value. In consideration thereof, the image composition device defines a relationship between at least one of the first pixel value and the second pixel value with a composition ratio according to the first function. In addition, the image composition device weights the first function with the second function that uses the difference as a variable. According to the composition ratio function including the first function and the second function, even when the difference is small, composition with an emphasis on one of the pixel values of the first pixel value and the second pixel value can be performed. As a result, a more preferable composite image can be obtained.

In one embodiment, the second image information may be image information captured by emitting a flash light to a subject, and the correction unit may further include a luminance correction unit which calculates a luminance correction coefficient for correcting a luminance of the second image information based on the luminance of the second image information and which corrects the luminance of the second image information using the luminance correction coefficient. According to this configuration, the luminance of the second image information captured with a flash light increases. Therefore, since the second image information to be composited becomes brighter, a more preferable composite image can be obtained.

In one embodiment, the image composition device may further include: a display control unit configured to cause an image to be displayed on an image display unit; an operation information acquiring unit configured to acquire operation information to be input by a user based on the image; and a recording control unit configured to cause information related to the image to be recorded in an image information recording unit using the operation information, wherein the composition unit may generate first composite image information as the composite image information by compositing the first image information and the second image information output from the correction unit, and generate second composite image information by compositing the first image information and the second image information input from the input unit, the display control unit may cause a first image related to the first composite image information and a second image related to the second composite image information to be displayed on the image display unit, the operation information may include image specifying information that specifies any one of the first composite image information and the second composite image information, and the image information recording unit may cause any one of the first composite image information and the second composite image information that is specified by the image specifying information to be recorded in the image information recording unit. According to this configuration, an image related to the first composite image information having an unadjusted color temperature and an image related to the second composite image information having an adjusted color temperature are generated. The display control unit causes the image related to the first composite image information and the image related to the second composite image information to be displayed on the image display unit. The user can view the image related to the first composite image information and the image related to the second composite image information to select whether or not to adjust a color temperature when compositing the first image information and the second image information. Therefore, a preferable composite image that suits the user's preferences can be obtained.

In one embodiment, the image composition device may further include: a display control unit configured to cause an image to be displayed on an image display unit; and an operation information acquiring unit configured to acquire operation information to be input by a user based on the image, wherein the operation information may include target color temperature information for correcting a color temperature of at least one of the first image information and the second image information, the correction unit may include a first correction unit configured to correct a color temperature of one of the first image information and the second image information so as to approach a color temperature of the other of the first image information and the second image information, and a second correction unit configured to correct a color temperature of at least one of the first image information and the second image information based on the target color temperature information, the composition unit may generate first composite image information as the composite image information by compositing the first image information and the second image information output from the first correction unit, and generate third composite image information by compositing the first image information and the second image information output from the second correction unit, and the display control unit may cause a third image related to the third composite image information to be displayed on the image display unit. The user can view the image related to the third composite image information to adjust a color temperature so that a composite image that suits the user's preferences can be obtained. Therefore, a preferable composite image that better suits the user's preferences can be obtained.

In one embodiment, the image composition device may further include: an operation information acquiring unit configured to acquire operation information to be input by a user based on the image, wherein the operation information may include target color temperature information for correcting a color temperature of at least one of the first image information and the second image information, the correction unit may include a first correction unit configured to correct a color temperature of one of the first image information and the second image information so as to approach a color temperature of the other of the first image information and the second image information, and a second correction unit configured to correct a color temperature of at least one of the first image information and the second image information based on the target color temperature information, the composition unit may generate first composite image information as the composite image information by compositing the first image information and the second image information output from the first correction unit, and generate third composite image information by compositing the first image information and the second image information output from the second correction unit, and the display control unit may cause a third image related to the third composite image information to be further displayed on the image display unit. The user can view the image related to the third composite image information to adjust a color temperature so that a composite image that suits the user's preferences can be obtained. Therefore, a preferable composite image that better suits the user's preferences can be obtained.

In one embodiment, the display control unit may cause a first part image that is a first part of the first image and a second part image that is a second part of the second image, the second part being adjacent to the first part, to be displayed on the image display unit, the first part image and the second part image may include a feature region included in the first image related to the first image information or the second image related to the second image information, and a boundary between the first part and the second part may be set so as to divide the feature region included in the first image information or the second image information. A region occupied by a face of a person, an illumination source, reflected illumination light, or the like in an image may be used as a reference for a user to determine color on an output image. A feature region refers to a region that may be used as a reference when a user determines color on an output image. Therefore, by setting a boundary so that the first image and the second image respectively include the feature region, a result of a composition in which a color temperature is corrected in the feature region and a result of composition in which a color temperature is not corrected can be readily compared with each other.

In one embodiment, the composition unit may generate second composite image information by compositing the first image information and the second image information input from the input unit, and generate fourth composite image information including information related to a third part image and information related to a fourth part image, the third part image may be a third part of the first image, and the fourth part image may be a fourth part of the second image or the third image, the third part being different from the fourth part. According to this configuration, an image related to the fourth composite image information includes the third divided image composited without correcting a color temperature and the fourth divided image composited after correcting a color temperature. Therefore, a preferable composite image that better suits the user's preferences can be obtained.

An image composition method in accordance with another aspect of the present invention is an image composition method of using a computer to perform a process for generating composite image information including a subject by compositing first image information including the subject captured under a first light environment condition and second image information including the subject captured under a second light environment condition that differs from the first light environment condition, the image composition method including: an inputting step of inputting the first image information and the second image information; a correcting step of correcting at least one of the first image information and the second image information input in the inputting step; and a compositing step of generating composite image information by compositing the first image information and the second image information processed in the correcting step, wherein in the correcting step, a color temperature of one of the first image information and the second image information is corrected so as to approach a color temperature of the other one of the first image information and the second image information.

A recording medium in accordance with another aspect of the present invention is a computer-readable recording medium on which is recorded an image composition program which causes a computer to function so as to perform a process of generating composite image information including a subject by compositing first image information including the subject captured under a first light environment condition and second image information including the subject captured under a second light environment condition that differs from the first light environment condition, the image composition program recorded on the computer-readable recording medium causing the computer to function as: an input unit that inputs the first image information and the second image information; a correction unit that corrects at least one of the first image information and the second image information input from the input unit; and a composition unit that generates the composite image information by compositing the first image information and the second image information output from the correction unit, wherein the correction unit corrects a color temperature of one of the first image information and the second image information so as to approach a color temperature of the other one of the first image information and the second image information.

The image composition method and the recording medium described above achieve similar effects to the image composition device in accordance with the aspect of the present invention described earlier.

An image composition device in accordance with yet another aspect of the present invention is an image composition device which generates composite image information including a subject by compositing first image information including the subject captured under a first light environment condition and second image information including the subject captured under a second light environment condition that differs from the first light environment condition, the image composition device including: an input unit that inputs the first image information and the second image information; and a composition unit that generates the composite image information by compositing the first image information and the second image information input from the input unit, wherein the composition unit calculates a difference between a first pixel value of a first composited pixel which constitutes the first image information and a second pixel value of a second composited pixel which constitutes the second image information and corresponds to the first composited pixel and calculates a composition ratio representing a proportion of the first pixel value to a composite pixel value of a composite pixel which constitutes the composite image information, based on at least one of the first pixel value and the second pixel value, the difference, and a composition ratio function, and the composition ratio function includes a first function which defines a relationship between the at least one of the first pixel value and the second pixel value and the composition ratio and a second function which corresponds to the difference and weights the first function.

Depending on a light environment condition, a difference between the first pixel value and the second pixel value may be small. In this case, the first pixel value and the second pixel value are composited based on a prescribed ratio. When the difference is small, a more preferable composite image may be obtained by compositing with an emphasis on one of the pixel values of the first pixel value and the second pixel value. In consideration thereof, the image composition device defines a relationship between at least one of the first pixel value and the second pixel value with a composition ratio according to the first function. In addition, the image composition device weights the first function with the second function that uses the difference as a variable. According to the composition ratio function including the first function and the second function, when the difference is small, composition with an emphasis on one of the pixel values of the first pixel value and the second pixel value can be performed. As a result, a more preferable composite image can be obtained.

An image composition method in accordance with yet another aspect of the present invention is an image composition method of using a computer to perform a process for generating composite image information including a subject by compositing first image information including the subject captured under a first light environment condition and second image information including the subject captured under a second light environment condition that differs from the first light environment condition, the image composition method including: an inputting step of inputting the first image information and the second image information; and a compositing step of generating the composite image information by compositing the first image information and the second image information input in the inputting step, wherein in the compositing step, a difference between a first pixel value of a first composited pixel which constitutes the first image information and a second pixel value of a second composited pixel which constitutes the second image information and corresponds to the first composited pixel is calculated, and a composition ratio representing a proportion of the first pixel value to a composite pixel value of a composite pixel which constitutes the composite image information is calculated based on at least one of the first pixel value and the second pixel value, the difference, and a composition ratio function, and the composition ratio function defines a relationship among the at least one of the first pixel value and the second pixel value, the difference, and the composition ratio.

A recording medium in accordance with another aspect of the present invention is a computer-readable recording medium on which is recorded an image composition program which causes a computer to function so as to perform a process of generating composite image information including a subject by compositing first image information including the subject captured under a first light environment condition and second image information including the subject captured under a second light environment condition that differs from the first light environment condition, the image composition program recorded on the computer-readable recording medium causing the computer to function as: an input unit that inputs the first image information and the second image information; and a composition unit that generates the composite image information by compositing the first image information and the second image information input from the input unit, wherein the composition unit calculates a difference between a first pixel value of a first composited pixel which constitutes the first image information and a second pixel value of a second composited pixel which constitutes the second image information and corresponds to the first composited pixel and calculates a composition ratio representing a proportion of the first pixel value to a composite pixel value of a composite pixel which constitutes the composite image information, based on at least one of the first pixel value and the second pixel value, the difference, and a composition ratio function, and the composition ratio function defines a relationship among the at least one of the first pixel value and the second pixel value, the difference, and the composition ratio.

The image composition method, and the recording medium described above achieve similar effects to the image composition device in accordance with the yet other aspect of the present invention described earlier.

According to the various aspects and embodiments of the present invention, an image composition device, an image composition method and a recording medium which enable a preferable composite image to be obtained are provided.

BRIEF DESCRIPTION OF THE DRAWINGS

FIG. 8A is a graph showing an example of a relationship between a second luminance of a flash image and a composition ratio;
FIG. 8B is another graph showing an example of a relationship between a second luminance of a flash image and a composition ratio;
and FIG. 8C is yet another graph showing an example of a relationship between a second luminance of a flash image and a composition ratio.

DESCRIPTION OF EMBODIMENTS

Figure 1:
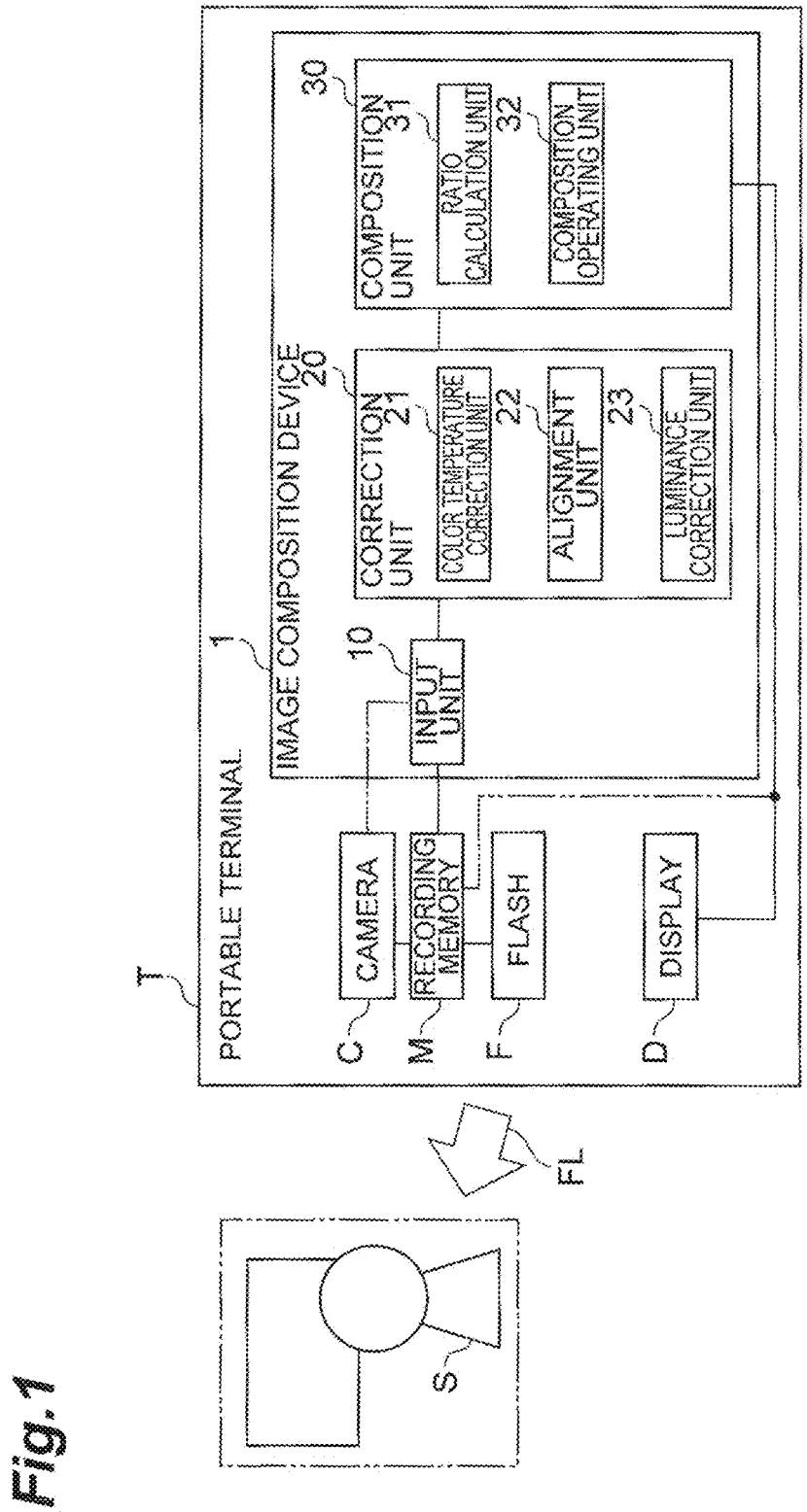
FIG. 1 is a functional block diagram of a portable terminal including an image composition device in accordance with an embodiment.

In the following, embodiments of the present invention will be explained with reference to the accompanying drawings. In the drawings, the same or equivalent parts will be referred to with the same signs while omitting their redundant descriptions.

The image composition device in accordance with this embodiment is favorably mounted in mobile terminals whose resources are limited, such as cellular phones, digital cameras, and PDAs (Personal Digital Assistants), for example. However, the image composition device may be mounted not only in these mobile terminals, but also in typical computers, for example. Other examples of the image composition device include the so-called on-chip ISPs (Image Signal Processors) built in imaging devices. By way of example, the image composition device mounted in a portable terminal will be explained in the following for easier understanding.

Figure 2:
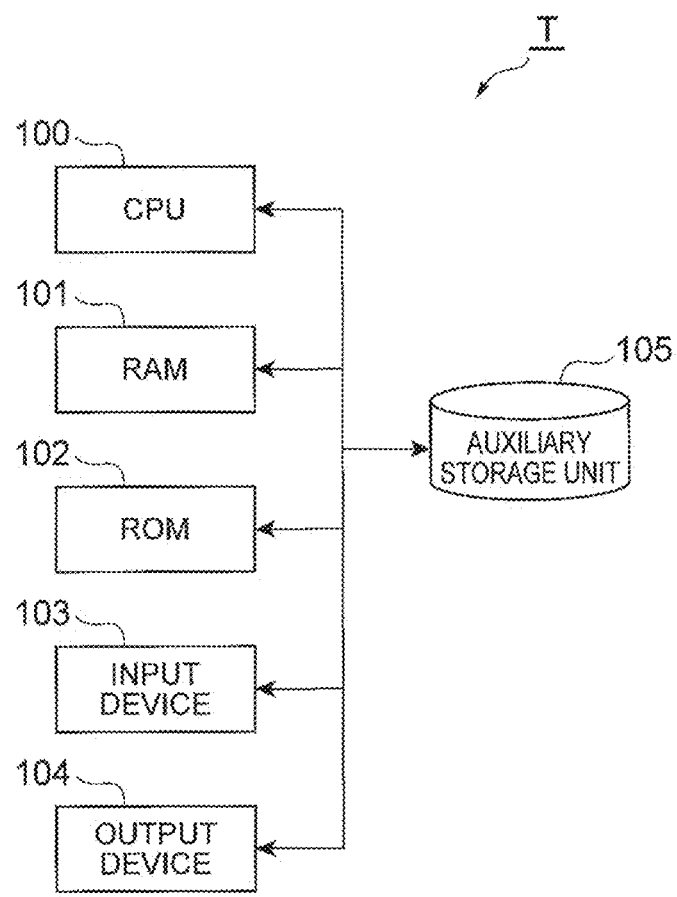
FIG. 2 is a hardware configuration diagram of a portable terminal including an image composition device in accordance with an embodiment.

A portable terminal T shown in FIG. 1 is a portable terminal carried around by a user or the like. The portable terminal T includes a hardware configuration shown in FIG. 2. As shown in FIG. 2, the portable terminal T is configured as an ordinary computer system. The computer system physically includes a central processing unit (CPU) 100, a primary storage device such as a random access memory (RAM) 101 and a read only memory (ROM) 102, an input device 103 such as a camera or a keyboard, an output device 104 such as a display, an auxiliary storage unit 105 such as a hard disk, and the like. Functions of the portable terminal T and image composition device 1 (it will be explained later) are achieved by causing hardware such as the CPU 100, RAM 101, and ROM 102 to read predetermined computer programs so as to operate the input device 103 and output device 104 and to read/write data from/to the main storage unit and auxiliary storage unit 105 under the control of the CPU 100. The portable terminal T may further comprise a communication module and the like. The image composition device 1 is explained as a hardware structure of the portable terminal T in the foregoing, but may be constructed as a typical computer system. The typical computer system includes the CPU 100, main storage units such as the RAM 101 and ROM 102, output device 104, auxiliary storage unit 105, and the like.

As shown in FIG. 1, the portable terminal T comprises a camera C, a recording memory M, a flash F, a display D, and the image composition device 1. The camera C has a function of capturing a still image and/or moving images. The moving images include a plurality of frame images which are consecutive in a time series. Moreover, the camera C may include a continuous imaging function. A continuous imaging function refers to a function of repetitively capturing images at prescribed intervals from a timing specified by a user operation or the like. The camera C outputs frame images to the recording memory M. The recording memory M records image information and various types of data related to control of the portable terminal T. Data recorded on the recording memory M can be referenced from various components that constitute the portable terminal T.

The flash F emits a flash light to a subject S. The portable terminal T has a function of adjusting exposure when capturing an image using the flash F. Specifically, the portable terminal T adjusts an exposure condition (Ev value) so that an image captured using the flash F does not contain a so-called overexposure area. Any method can be used to set the exposure condition. For example, the exposure condition is set by performing photometry using preliminary light emission or by lowering an exposure value to a value set in advance. The display D displays a composite image output from the image composition device 1.

The image composition device 1 comprises an input unit 10, a correction unit 20, and a composition unit 30. The image composition device 1 generates the composite image information including the subject S by compositing first image information and second image information. The first image information includes the subject S captured under a first light environment condition. The second image information includes the subject S captured under a second light environment condition. The second light environment condition differs from the first light environment condition. The first image information and the second image information are input to the image composition device 1 from the recording memory M. The image composition device 1 generates the composite image information by processing the input first image information and second image information. Subsequently, the image composition device 1 outputs the composite image information to, for example, the display D and the recording memory M. The image composition device 1 composites a flash image and a no-flash image. A flash image refers to an image of the subject S captured using a flash. A no-flash image refers to an image of the subject S captured without using a flash.

In this case, the first light environment condition refers to a light environment condition that solely consists of ambient light. In other words, the first light environment condition is a light environment condition that does not include a flash light. The first image information includes information related to a no-flash image. Specifically, the first image information includes a pixel value constituting a no-flash image, a luminance included in the pixel value, and information related to a color temperature and the like. The second light environment condition refers to a light environment condition including a flash light and ambient light. In other words, the second light environment condition differs from the first light environment condition in that the second light environment condition includes a flash light. The second image information includes information related to a flash image. Specifically, the second image information includes a pixel value constituting a flash image, a luminance included in the pixel value, and information related to a color temperature and the like.

The input unit 10 has a function of enabling input of a no-flash image and a flash image. The input unit 10 is connected to the recording memory M. Moreover, the input unit 10 may be connected to the camera C. In addition, the input unit 10 is connected to the correction unit 20. The input unit 10 outputs a no-flash image and a flash image to the correction unit 20.

Figure 3:
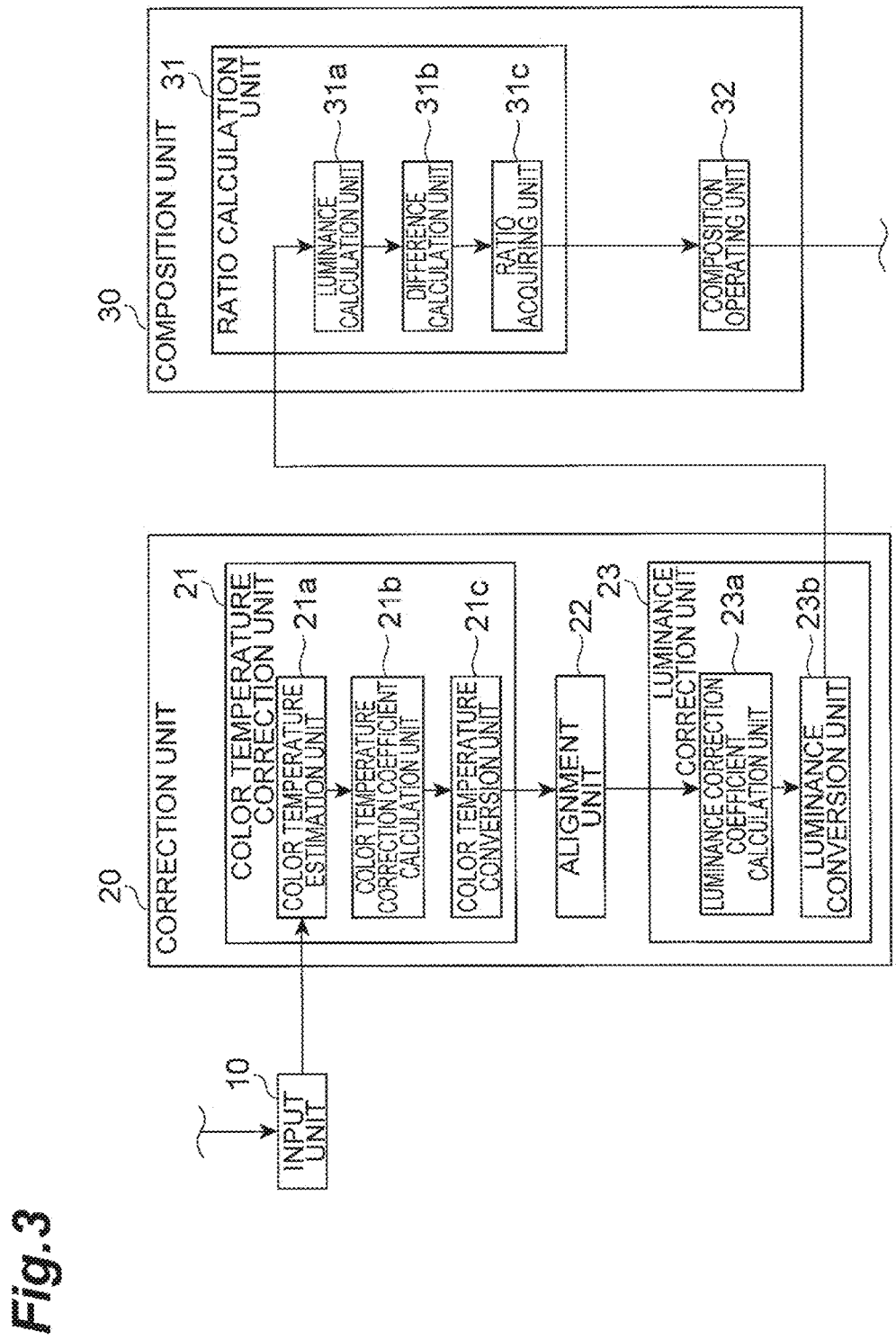
FIG. 3 is a functional block diagram of an image composition device in accordance with an embodiment.

As shown in FIG. 3, the correction unit 20 comprises a color temperature correction unit 21, an alignment unit 22, and a luminance correction unit 23. The correction unit 20 is connected to the input unit 10. A no-flash image or a flash image is input to the correction unit 20 from the input unit 10. The correction unit 20 has a function of correcting image information of at least one of the no-flash image and the flash image input from the input unit 10. The correction includes correction of a color temperature, correction of luminance, and the like. The correction unit 20 in accordance with the present embodiment corrects a color temperature of a no-flash image. In addition, the correction unit 20 corrects luminance of a flash image. The correction unit 20 is connected to the composition unit 30. The correction unit 20 outputs image information after correction to the composition unit 30. The correction unit 20 in accordance with the present embodiment outputs a no-flash image having a corrected color temperature and a flash image having corrected luminance.

The color temperature correction unit 21 comprises a color temperature estimation unit 21a, a color temperature correction coefficient calculation unit 21b, and a color temperature conversion unit 21c. The color temperature correction unit 21 is connected to the input unit 10. A no-flash image and a flash image are input to the color temperature correction unit 21 from the input unit 10. The color temperature correction unit 21 has a function of converting a color temperature of one of the no-flash image and the flash image to a color temperature of the other image. The color temperature correction unit 21 in accordance with the present embodiment converts a color temperature of a no-flash image. The color temperature correction unit 21 is connected to the alignment unit 22. The color temperature correction unit 21 outputs a no-flash image having a corrected color temperature and a no-flash image having an uncorrected color temperature to the alignment unit 22.

The color temperature estimation unit 21a is connected to the input unit 10. A no-flash image and a flash image are input to the color temperature estimation unit 21a from the input unit 10. The color temperature estimation unit 21a has a function of estimating a color temperature of a no-flash image that is an object of color temperature conversion. A specific process of calculating a color temperature will be described later. Moreover, in the image composition device 1 in accordance with the present embodiment, processing is performed on the assumption that a color temperature of a flash image is known. Alternatively, the image composition device 1 may calculate a color temperature of a flash image at the color temperature estimation unit 21a. The color temperature estimation unit 21a is connected to the color temperature correction coefficient calculation unit 21b. The color temperature estimation unit 21a outputs information including color temperature information to the color temperature correction coefficient calculation unit 21b.

The color temperature correction coefficient calculation unit 21b is connected to the color temperature estimation unit 21a. Various types of information are input to the color temperature correction coefficient calculation unit 21b from the color temperature estimation unit 21a. The various types of information include a no-flash image, a flash image, color temperature information of a flash image, and color temperature information of the no-flash image. The color temperature correction coefficient calculation unit 21b has a function of calculating a color temperature correction coefficient. A color temperature correction coefficient refers to a coefficient for correcting a color temperature of a no-flash image. A color temperature correction coefficient is calculated based on color temperature information. A specific process of calculating a color temperature correction coefficient will be described later. The color temperature correction coefficient calculation unit 21b is connected to the color temperature conversion unit 21c. The color temperature correction coefficient calculation unit 21b outputs information including a color temperature correction coefficient to the color temperature conversion unit 21c.

The color temperature conversion unit 21c is connected to the color temperature correction coefficient calculation unit 21b. Various types of information are input to the color temperature conversion unit 21c from the color temperature correction coefficient calculation unit 21b. The various types of information include a no-flash image, a flash image, color temperature information of the no-flash image, and a color temperature correction coefficient. The color temperature conversion unit 21c converts the color temperature of the no-flash image based on the color temperature correction coefficient. Specifically, the color temperature conversion unit 21c converts the color temperature for each pixel constituting the no-flash image. The color temperature conversion unit 21c is connected to the alignment unit 22. The color temperature conversion unit 21c outputs information including a no-flash image having a converted color temperature to the alignment unit 22.

The alignment unit 22 has a function of aligning a no-flash image and flash image to each other. The alignment unit 22 in accordance with the present embodiment uses the no-flash image as a reference image. In addition, the alignment unit 22 generates information that associates the no-flash image and the flash image with each other. The alignment unit 22 is connected to the luminance correction unit 23. The alignment unit 22 outputs various types of information including correspondence information of images to the luminance correction unit 23. In this case, correspondence information of images refers to information required when one of the images is used as a reference to superimpose the other image thereon. For example, correspondence information of images includes information for rotating and/or translating the other image.

The luminance correction unit 23 is connected to the alignment unit 22. Various types of information are input to the luminance correction unit 23 from the alignment unit 22. The various types of information include a no-flash image, a flash image, and correspondence information of the images. The luminance correction unit 23 comprises a luminance correction coefficient calculation unit 23a and a luminance converting unit 23b. The luminance correction unit 23 calculates a luminance correction coefficient based on luminance of a flash image. A luminance correction coefficient refers to a coefficient for correcting the luminance of a flash image. The luminance correction unit 23 has a function of correcting the luminance of a flash image using a luminance correction coefficient. The luminance correction unit 23 outputs a no-flash image with uncorrected luminance and a flash image having corrected luminance to the composition unit 30.

The luminance correction coefficient calculation unit 23a is connected to the alignment unit 22. Various types of information are input to the luminance correction coefficient calculation unit 23a from the alignment unit 22. The various types of information include a flash image. The luminance correction coefficient calculation unit 23a has a function of calculating a luminance correction coefficient. A specific process of calculating a luminance correction coefficient will be described later. The luminance correction coefficient calculation unit 23a is connected to the luminance converting unit 23b. The luminance correction coefficient calculation unit 23a outputs various types of information including a luminance correction coefficient to the luminance converting unit 23b.

The luminance converting unit 23b is connected to the luminance correction coefficient calculation unit 23a. Various types of information are input to the luminance converting unit 23b from the luminance correction coefficient calculation unit 23a. The various types of information include a luminance correction coefficient and a flash image. The luminance converting unit 23b corrects a flash image so that luminance of the entire flash image increases. A luminance correction coefficient is used for this correction. A specific correcting process will be described later. The luminance converting unit 23b is connected to the composition unit 30. The luminance converting unit 23b outputs various types of information to the composition unit 30. The various types of information include a flash image having corrected luminance. Moreover, a luminance converting process with respect to a flash image may be performed as necessary and may be omitted.

The composition unit 30 comprises a ratio calculation unit 31 and a composition operating unit 32. The composition unit 30 is connected to the correction unit 20. A no-flash image having a corrected color temperature and a flash image having corrected luminance are input to the composition unit 30. In addition, information representing a correspondence relationship of pixels is input to the composition unit 30. The information representing a correspondence relationship is information representing a correspondence relationship between a pixel of the no-flash image and a pixel of the flash image. The composition unit 30 has a function of generating a composite image. The composite image is an image that is a composite of the no-flash image and the flash image output from the correction unit 20. The composition unit 30 is connected to the display D. The composition unit 30 outputs a composite image to the display D.

The ratio calculation unit 31 comprises a luminance calculation unit 31*a*, a difference calculation unit 31*b*, and a ratio acquiring unit 31*c*. The ratio calculation unit 31 has a function of calculating a composition ratio. The calculation is based on at least one of the first pixel value and the second pixel value, a difference, and a composition ratio function.

The luminance calculation unit 31*a* is connected to the luminance converting unit 23*b* of the correction unit 20. Various types of information are input to the luminance calculation unit 31*a* from the luminance converting unit 23*b*. The various types of information include a no-flash image having a corrected color temperature, a flash image having corrected luminance, and correspondence relationship between respective pixels of the no-flash image and the flash image. The luminance calculation unit 31*a* has a function of calculating a first luminance (first pixel value) and a second luminance (second pixel value). A first luminance refers to luminance of a first composited pixel that constitutes a no-flash image. A second luminance refers to luminance of a second composited pixel that constitutes a flash image. The second composited pixel corresponds to the first composited pixel. The luminance calculation unit 31*a* is connected to the difference calculation unit 31*b*. The luminance calculation unit 31*a* outputs information including the first luminance and the second luminance to the difference calculation unit 31*b*.

The difference calculation unit 31*b* is connected to the luminance calculation unit 31*a*. Various types of information are input to the difference calculation unit 31*b* from the luminance calculation unit 31*a*. The various types of information include a first luminance and a second luminance. The difference calculation unit 31*b* has a function of calculating a difference between the first luminance and the second luminance. The difference calculation unit 31*b* is connected to the ratio acquiring unit 31*c*. The difference calculation unit 31*b* outputs information including a difference to the ratio acquiring unit 31*c*.

The ratio acquiring unit 31*c* is connected to the difference calculation unit 31*b*. Various types of information are input to the ratio acquiring unit 31*c* from the difference calculation unit 31*b*. The various types of information include a difference, a first luminance, and a second luminance. The ratio acquiring unit 31*c* has a function of calculating a composition ratio. The calculation is based on the difference, the first luminance, and the second luminance. The composition ratio represents a proportion of the first luminance (first pixel value) to a composite luminance (composite pixel value) of a composite pixel constituting a composite image. A specific process of acquiring a composition ratio will be described later. The ratio acquiring unit 31*c* is connected to the composition operating unit 32. The ratio acquiring unit 31*c* outputs information including a composition ratio to the composition operating unit 32.

The composition operating unit 32 is connected to the ratio acquiring unit 31*c*. Various types of information are input to the composition operating unit 32 from the ratio acquiring unit 31*c*. The various types of information include a composition ratio, a first luminance, and a second luminance. The composition operating unit 32 has a function of calculating, based on the composition ratio, the first luminance, and the second luminance, a composite luminance that is a composite of the first luminance and the second luminance. A specific calculating process thereof will be described later. The composition operating unit 32 is connected to the display D. The composition operating unit 32 outputs a composite image to the display D. Alternatively, the composition operating unit 32 may be connected to the recording memory M and output a composite image to the recording memory M.

Figure 4:
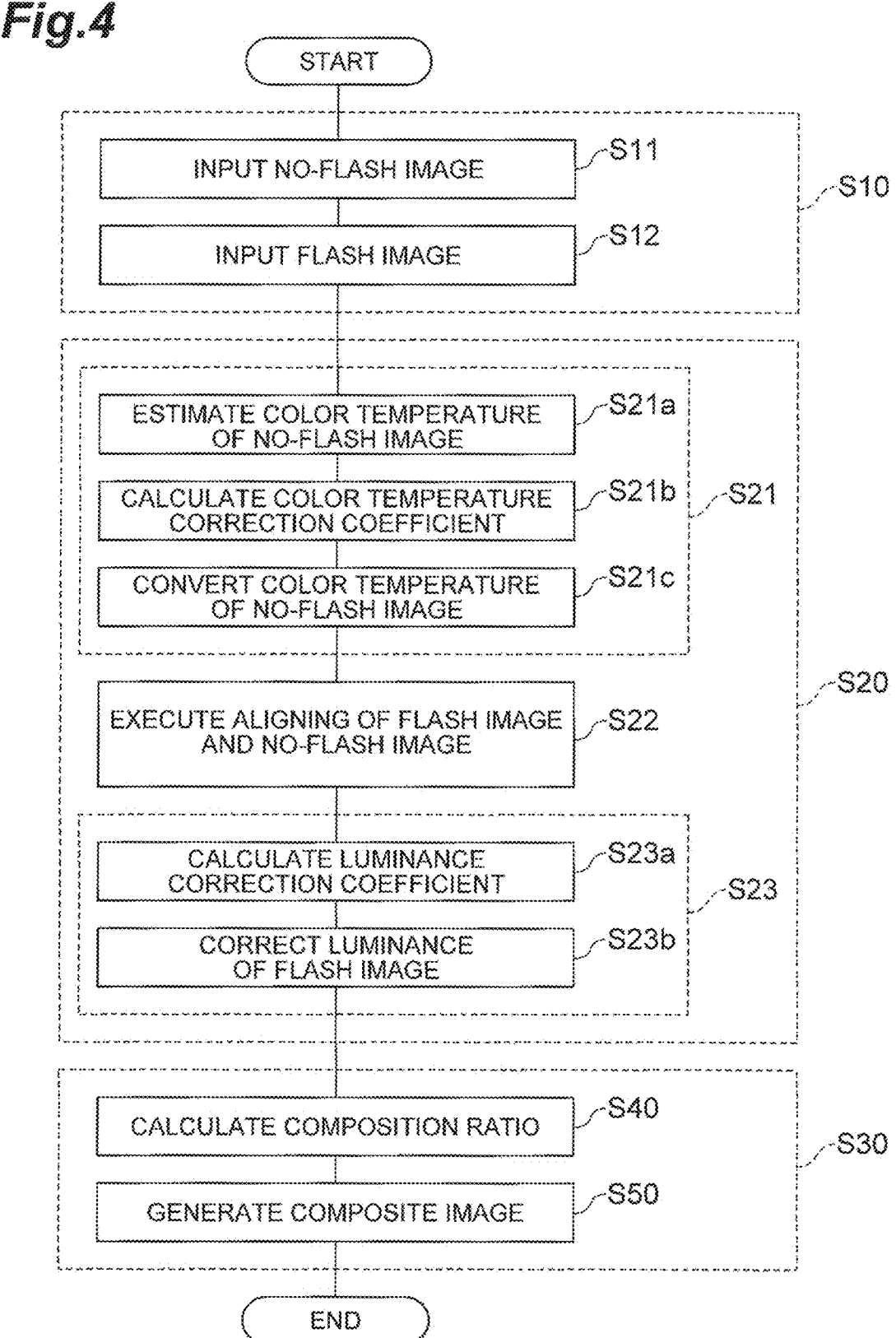
FIG. 4 is a flow chart explaining operations of an image composition device in accordance with an embodiment.
Figure 5:
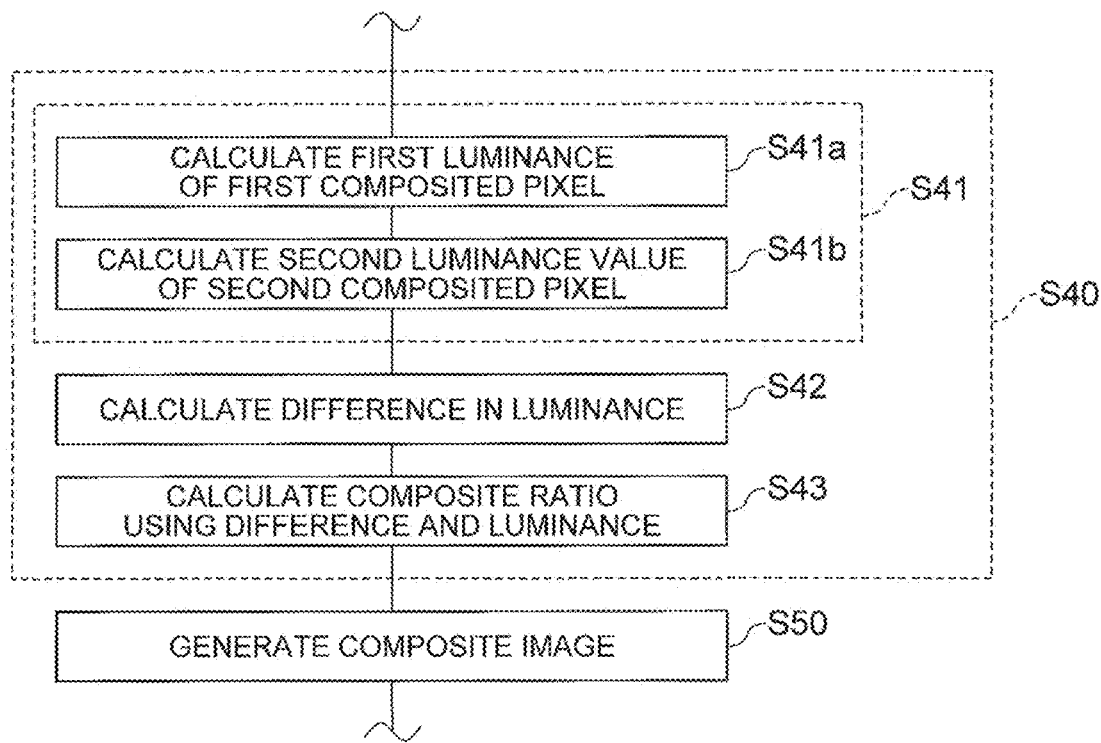
FIG. 5 is a flow chart explaining operations of an image composition device in accordance with an embodiment.

Next, operations of the image composition device 1 in accordance with the present embodiment will be described. In other words, an image composition method in accordance with the present embodiment will be described. FIGS. 4 and 5 are flow charts showing operations of the image composition device 1. For example, a control process shown in FIGS. 4 and 5 may be started at a timing when the imaging function of the portable terminal T is turned on and may be repetitively executed at prescribed intervals. Alternatively, execution of the control process shown in FIGS. 4 and 5 may be triggered by an operation performed by a user as necessary.

The portable terminal T obtains a no-flash image and a flash image by controlling the camera C and the flash F. In addition, the portable terminal T records the respective images in the recording memory M. For example, when a user presses a shutter button, the portable terminal T first controls the flash F so that a flash light is not emitted. Next, the portable terminal T obtains a no-flash image by controlling the camera C to capture a subject S. Subsequently, the portable terminal T records the no-flash image in the recording memory M. When capturing a flash image, the portable terminal T controls an exposure condition (Ev value) of the camera C so that overexposure does not occur.

The input unit 10 executes an input step S10. In the input step S10, a no-flash image and a flash image are input. The input step S10 includes step S11 in which a no-flash image is input and step S12 in which a flash image is input. In the image composition device 1, a no-flash image and a flash image may be distinguished from each other based on an order of step S11 and step S12. In the present embodiment, a no-flash image is input first and a flash image is input next. Any other means may be adopted as means to distinguish a no-flash image and a flash image from each other. In addition, when a color temperature of a flash image is known (fixed value), step S12 in which a flash image is input can be executed after a color temperature correction step S21 to be described later.

The correction unit 20 executes a correction step S20 after the input step S10. In the correction step S20, the no-flash image and the flash image input in the input step S10 are corrected. The correction step S20 includes the color temperature correction step S21, an aligning step S22, and a luminance correction step S23.

After step S12 in which a flash image is input, the color temperature correction unit 21 executes the color temperature correction step S21. In the color temperature correction step S21, a color temperature of one of the no-flash image and the flash image is converted so as to approach a color temperature of the other. In the present embodiment, the color temperature of the no-flash image is converted. The color temperature correction step S21 includes step S21*a* in which a color temperature is estimated, step S21*b* in which a color temperature correction coefficient is calculated, and step S21*c* in which a color temperature is converted.

After step S12 in which a flash image is input, the color temperature estimation unit 21a executes step S21a in which a color temperature is estimated. The color temperature estimation unit 21a generates a shrunken image using a pixel value constituting the no-flash image. Subsequently, the color temperature estimation unit 21a obtains an R component, a G component, and a B component of the shrunken image. It is known that a relationship such as that shown in FIG. 6 exists between RGB components and a color temperature. A horizontal axis represents color temperature. A vertical axis represents luminance. In addition, graph G1 represents an R component, graph G2 represents a G component, and graph G3 represents a B component. If respective values of the R component, the G component, and the B component are known, a color temperature can be estimated using ratios among the respective known values. For example, a ratio (G/R) of the G component to the R component and a ratio (B/R) of the B component to the R component are calculated. Next, using the graphs shown in FIG. 6, a color temperature which the ratios (G/R and B/R) of the respective RGB components most closely resemble are obtained. Known numerical calculation methods such as binary search can be used for the estimation.

Figure 6:
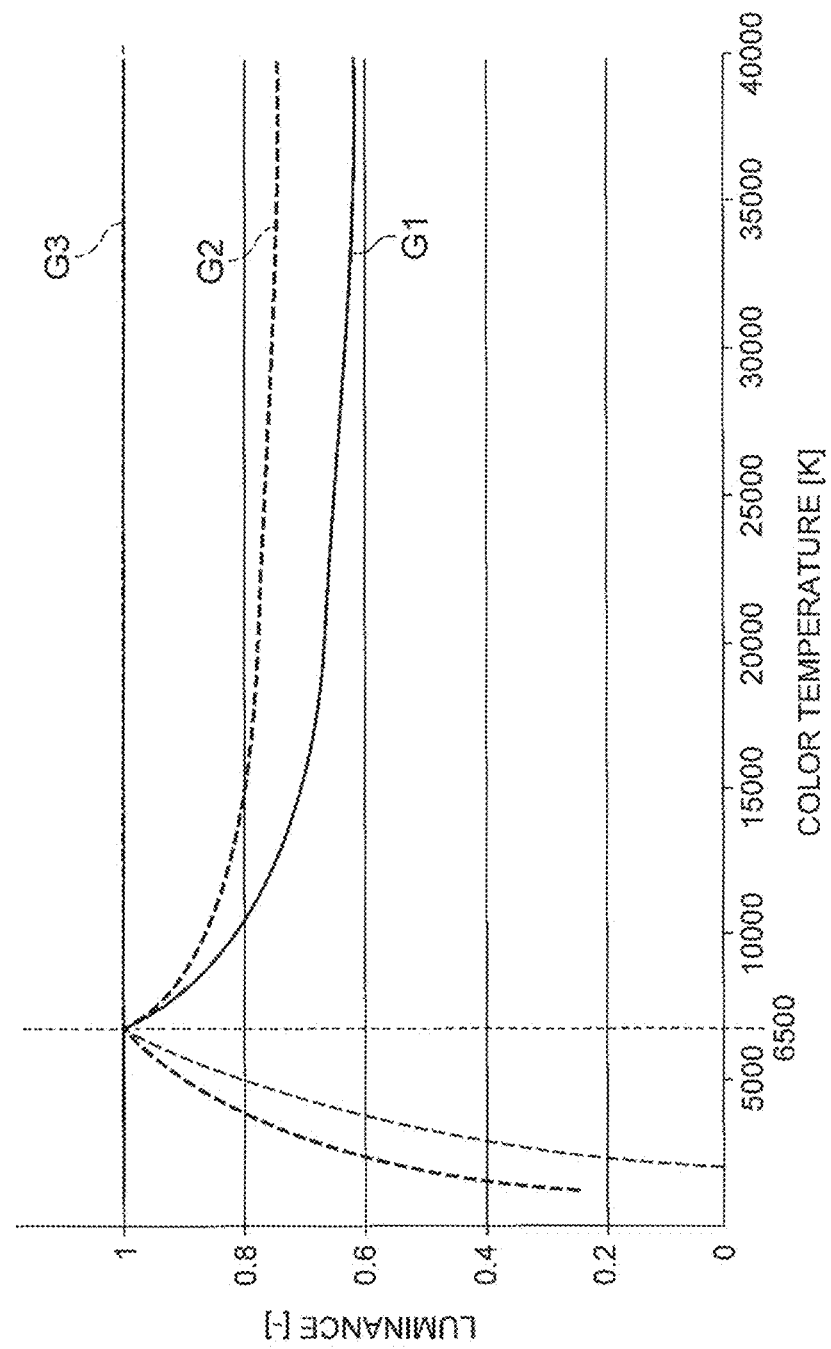
FIG. 6 is a graph showing a relationship between luminance and color temperature.

After step S21a in which a color temperature is estimated, the color temperature correction coefficient calculation unit 21b executes step S21b in which a color temperature correction coefficient is calculated. The color temperature correction coefficient calculation unit 21b calculates a ratio of the R component, the G component, and the B component of a shrunken image of the no-flash image. The color temperature of the no-flash image estimated in step S21a and the graphs shown in FIG. 6 are used for the calculation. For example, when the estimated color temperature is 2000 K to 6500 K, a ratio of the G component to the R component and a ratio of the B component to the R component are calculated. A flash image is an image captured by emitting a flash light FL. A color temperature of the flash light FL is known. In this case, it is assumed that the color temperature of the flash light FL is dominant among the color temperature of the flash image. Based on this assumption, the color temperature of the flash light FL is used as the color temperature of the flash image. Subsequently, the ratio of the G component to the R component and the ratio of the B component to the R component are calculated.

Next, a color temperature correction coefficient is calculated. A ratio among the R component, the G component, and the B component of the no-flash image and a ratio among the R component, the G component, and the B component of the flash image are used to calculate the color temperature correction coefficient. The color temperature correction coefficient is a conversion coefficient for causing the ratio of the G component to the R component of the no-flash image to approach the ratio of the G component to the R component of the flash image. In addition, the color temperature correction coefficient is a conversion coefficient for causing the ratio of the B component to the R component of the no-flash image to approach the ratio of the B component to the R component of the flash image. The ratio of the G component to the R component and the ratio of the B component to the R component in the shrunken image of the no-flash image are known. In a similar manner, the ratio of the G component to the R component and the ratio of the B component to the R component in the shrunken image of the flash image are known. If color temperature correction coefficients of the respective RGB channels are denoted by a(R), a(G), and a(B), then expressions (1A), (1B), and (1C) below are defined. Therefore, a color temperature correction coefficient α can be calculated using the expressions (1A), (1B), and (1C) below.

$$a(R)=Y(R)\_flash/Y(R)\_noflash \quad (1A)$$

$$a(G)=Y(G)\_flash/Y(G)\_noflash \quad (1B)$$

$$a(B)=Y(B)\_flash/Y(B)\_noflash \quad (1C)$$

After step S21b in which a color temperature correction coefficient is calculated, the color temperature conversion unit 21c executes step S21c in which a color temperature is converted. In step S21c, ratios among the R component, the G component, and the B component are converted for each pixel constituting the no-flash image. Ratios among the R component, the G component, and the B component and a color temperature correction coefficient $α_T$ are used for the conversion of ratios.

Figure 7A:
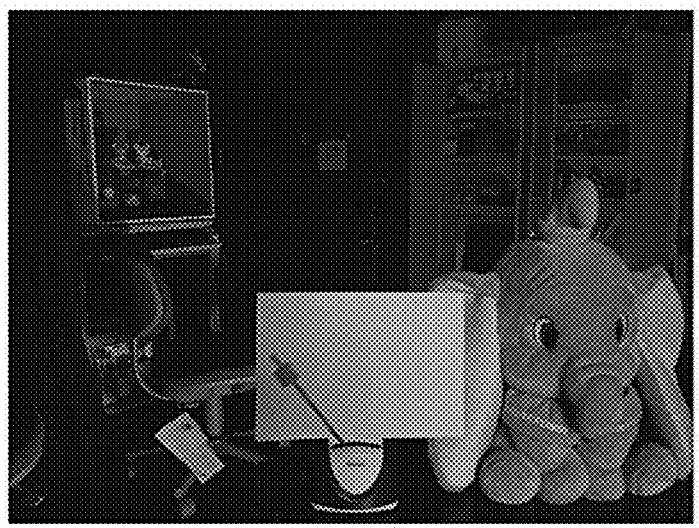
FIG. 7A shows an example of a no-flash image before color temperature correction.
Figure 7B:
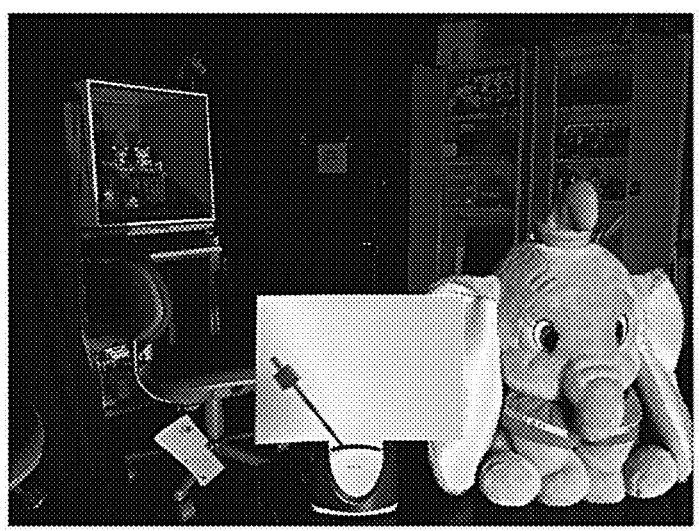
FIG. 7B shows an example of a no-flash image after color temperature correction.
Figure 7C:
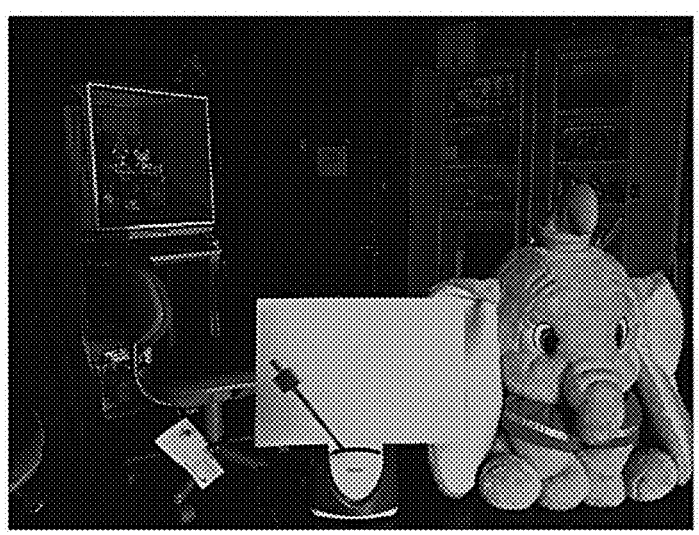
FIG. 7C shows another example of a no-flash image after color temperature correction.

FIG. 7 shows examples of a no-flash image before color temperature correction (FIG. 7A) and no-flash images after color temperature correction (FIGS. 7B and 7C). A color temperature of the no-flash image before color temperature correction (FIG. 7A) is 2687 K (estimated value). The no-flash image shown in FIG. 7B is an image representing a correction of the color temperature to 6500 K. The no-flash image shown in FIG. 7C is an image representing a correction of the color temperature to 30000 K.

After the color temperature correction step S21, the alignment unit 22 executes the aligning step S22. In the aligning step S22, a pixel constituting the no-flash image and a pixel constituting the flash image are associated with each other. Specifically, first, the no-flash image is set as a reference image. Next, a plurality of feature points are extracted from the no-flash image. Then, using the feature points, the no-flash image and the flash image are associated with each other. As for a flash image, since a background thereof is susceptible to underexposure, the number of points that can be selected as feature points may be insufficient. Therefore, it is more advantageous to select a no-flash image as a reference image than a flash image.

When imaging is performed by emitting a flash light FL, the subject S may become excessively bright depending on a light intensity of the flash light FL, a distance from the portable terminal T to the subject S, exposure conditions of the camera C, and the like. When the subject S becomes excessively bright, the so-called overexposure area may possibly be created. It is difficult to repair a texture constituting the overexposure area after the imaging. Therefore, when imaging is performed by emitting the flash light FL, the camera C, the flash F, and the like are controlled so that overexposure is not created. For example, exposure conditions of the camera C are set based on a distance to the subject S and the like each time photography is performed. In a flash image photographed under such control, the occurrence of an overexposure area is suppressed. However, when this control is performed, luminance of the flash image decreases as a whole. In other words, the flash image tends to become darker. In consideration thereof, the luminance correction step S23 is performed. In the luminance correction step S23, a proportion of an overexposure area that is permissible with respect to the entire image is set. Subsequently, the luminance of the flash image is increased after the imaging until overexposure occurs at the set proportion.

After the aligning step S22, the luminance correction unit 23 executes the luminance correction step S23. Moreover, the luminance correction step S23 may be selectively executed as necessary. In the luminance correction step S23, luminance is corrected until exposure of the flash image becomes appropriate. A known luminance optimizing technique is used in the luminance correction step S23. For example, the luminance correction step S23 may include step S23a in which a luminance correction coefficient is calculated and step S23b in which luminance is converted.

After the correction step S20, the composition unit 30 executes a composition step S30. In the composition step S30, a composite image is generated. The composite image is a composition of the no-flash image and the flash image processed in the correction step S20. The composition step S30 includes a ratio calculation step S40 and a composition operation step S50.

After step S23 in which the luminance of the flash image is corrected, the ratio calculation unit 31 executes step S40 in which a ratio is calculated. As shown in FIG. 5, step S40 includes step S41 in which luminance is calculated, step S42 in which a difference is calculated, and step S43 in which a ratio is acquired.

After step S23b in which luminance is converted, the luminance calculation unit 31a executes step S41 in which luminance is calculated. In step S41, a first composited pixel to be an object of a compositing process is selected from the no-flash image. Subsequently, respective luminance ($Y_{noflash}$) of an R component, a G component, and a B component of the first composited pixel is calculated (step S41a). Next, a second composited pixel to be an object of the compositing process is selected from the flash image. The second composited pixel is a pixel corresponding to the first composited pixel. This correspondence relationship is acquired based on information obtained in step S23. Respective luminance ($Y_{flash}$) of an R component, a G component, and a B component of the second composited pixel is calculated (step S41b).

After step S41 in which luminance is calculated, the difference calculation unit 31b executes step S42 in which a difference in luminance is calculated. The difference calculation unit 31b calculates a difference ($Y_{diff}$) based on expression (2) below.

$$Y_{diff} = Y_{flash} - Y_{noflash} \qquad (2)$$

After step S42 in which a difference in luminance is calculated, the ratio acquiring unit 31c executes step S43 in which a composition ratio is acquired. In step S43, a composition ratio ($W_{flash}$) is acquired based on expression (3) below. Expression (3) below represents a composition ratio function in accordance with the present invention. According to the composition ratio function presented as expression (3), the difference ($Y_{diff}$) between first luminance of the no-flash image and second luminance of the flash image causes a relationship between the second luminance ($Y_{flash}$) of the flash image and the composition ratio ($W_{flash}$) to be converted. For example, when the second luminance of the flash image is lower than the first luminance of the no-flash image, the relationship between the second luminance of the flash image and the composition ratio is as represented by a function shown in FIG. 8A. In addition, when the second luminance of the flash image is equal to the first luminance of the no-flash image, the relationship between the second luminance of the flash image and the composition ratio is as represented by a function shown in FIG. 8B. Furthermore, when the second luminance of the flash image is higher than the first luminance of the no-flash image, the relationship between the second luminance of the flash image and the composition ratio is as represented by a function shown in FIG. 8C. As shown in FIGS. 8A, 8B, and 8C, all of the composition ratio functions include a range that is larger than 0 and smaller than 1. For example, when the composition ratio is 1, the composite luminance is equal to the second luminance. In addition, when the composition ratio is 0, the composite luminance is equal to the first luminance. Furthermore, when the composition ratio is larger than 0 and smaller than 1, the composite luminance is defined by a prescribed proportion of the first luminance and the second luminance.

$$W_{flash} = f_{flash}(Y_{flash}) \times f_{diff}(Y_{diff}) \qquad (3)$$
$$= sigmoid(Y_{flash}; \alpha_1, \beta_1) \times \{sigmoid(Y_{diff}; \alpha_2, \beta_2) + 0.5\}$$

Moreover, a sigmoid function {sigmoid(x; α,β)} is a function expressed as expression (4) below.

$$sigmoid(x; \alpha, \beta) = 1/(1+exp(-\alpha \times (x-\beta))) \qquad (4),$$

where α and β denote coefficients that determine a curve of the sigmoid function.

Figure 9A:
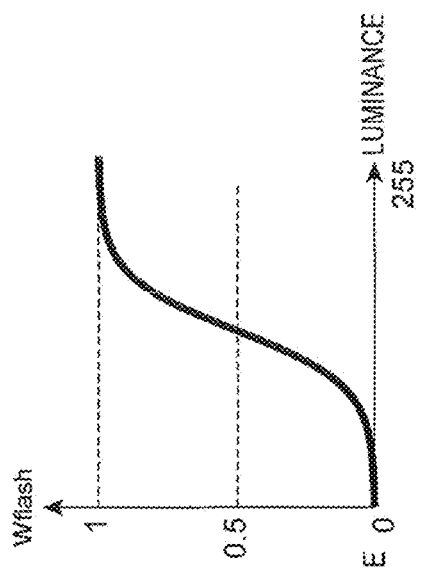
FIG. 9A is a conceptual diagram for explaining steps for calculating a composition ratio.
Figure 9B:
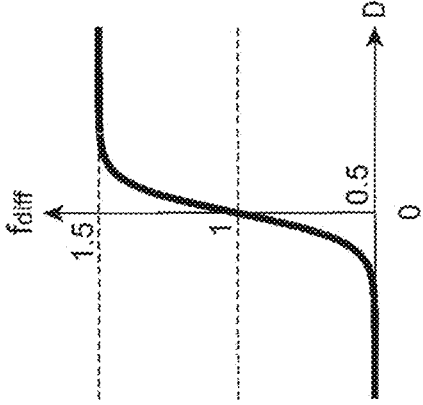
FIG. 9B is another conceptual diagram for explaining steps for calculating a composition ratio.
Figure 9C:
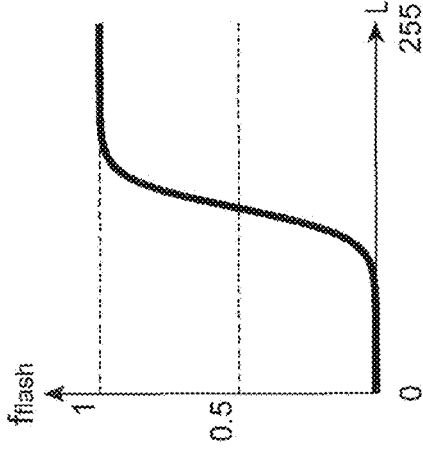
FIG. 9C is yet another conceptual diagram for explaining steps for calculating a composition ratio.

The first term of the right side of expression (3) represents a sigmoid function as a first function (refer to FIG. 9A). In the first term of the right side, a dependent variable ($f_{flash}$) varies between 0 and 1. In addition, the second term of the right side of expression (3) represents a sigmoid function as a second function (refer to FIG. 9B). The second function is a function that weights the first function. In the second term of the right side, a dependent variable ($f_{diff}$) varies between 0.5 and 1.5. The second term of the right side is a weighting function that determines an amplitude of the first term of the right side. For example, when the difference ($Y_{diff}$) is 0, the second term of the right side is 1. Accordingly, a function for obtaining the composition ratio ($W_{flash}$) becomes the same as the function represented by the first term of the right side (refer to FIG. 9C). According to the function represented by the first term of the right side, when the luminance ($Y_{flash}$) of the flash image is high, a proportion of the second luminance among the composite luminance is large. In other words, when the flash image is bright, the proportion of the second luminance among the composite luminance increases. According to the function represented by the first term of the right side, when the luminance ($Y_{flash}$) of the flash image is low, a proportion of the second luminance among the composite luminance is small. In other words, when the flash image is dark, the proportion of the second luminance among the composite luminance decreases.

When the luminance of the flash image is low, it is likely that the no-flash image and the flash image were captured outdoors at nighttime. In addition, the low luminance of the flash image likely represents a pixel constituting a night view that is beyond the range of the flash light FL. In this case, increasing a composition ratio of the luminance of the no-flash image can create a more natural night view as compared to setting equal composition ratios for the luminance of the no-flash image and the luminance of the flash image.

On the other hand, when the luminance of the flash image is high, it is likely that the no-flash image and the flash image were captured in a dark room. In addition, the high luminance of the flash image likely represents a pixel constituting a foreground within the range of the flash light FL. In this case, increasing a composition ratio of the second luminance of the flash image enables an effect of emitting a flash light to be maximized as compared to setting equal composition ratios for the luminance of the no-flash image and the luminance of the flash image. Therefore, by increasing the composition ratio of the second luminance of the flash image, a more natural image can be produced.

As described above, in the image composition method in accordance with the present embodiment, luminance and a difference in luminance are used as variables for calculating a composition ratio. By using these two variables, a case of compositing two images captured outdoors and a case of compositing two images captured indoors can be handled using one composition ratio function.

After the ratio calculation step S40, the composition operating unit 32 executes the composition operation step S50. In step S50, a composite luminance is calculated based on expression (5) below. In step S50, by performing the process represented by expression (5) below on each of the R component, the G component, and the B component, a composite luminance (Y_c) of the R component, the G component, and the B component constituting a composite pixel value is calculated.

$$Y\_C = W_{flash} \times Y_{flash} + [1 - W_{flash}] \times Y_{noflash} \quad (5)$$

In addition, steps S40 and S50 described above are repetitively performed for all pixels that are objects of composition of the no-flash image and the flash image. By executing steps S10 to S50 described above, a composite image is obtained.

Figure 10A:
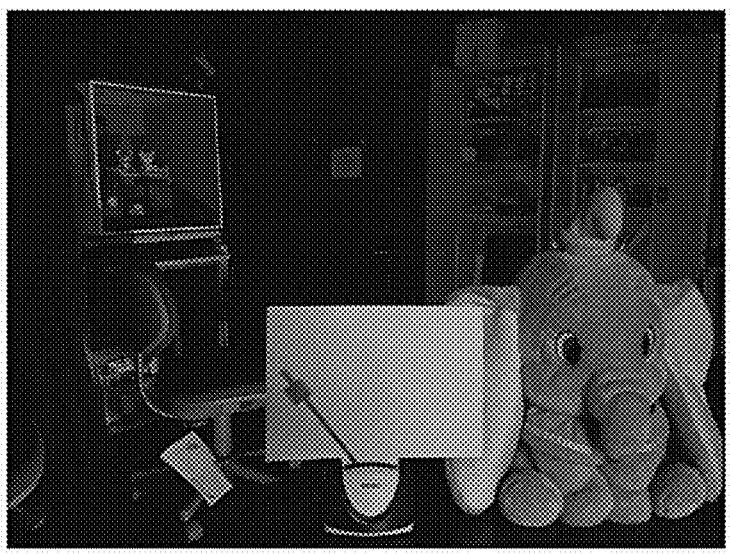
FIG. 10A shows an example of a flash image captured indoors.
Figure 11A:
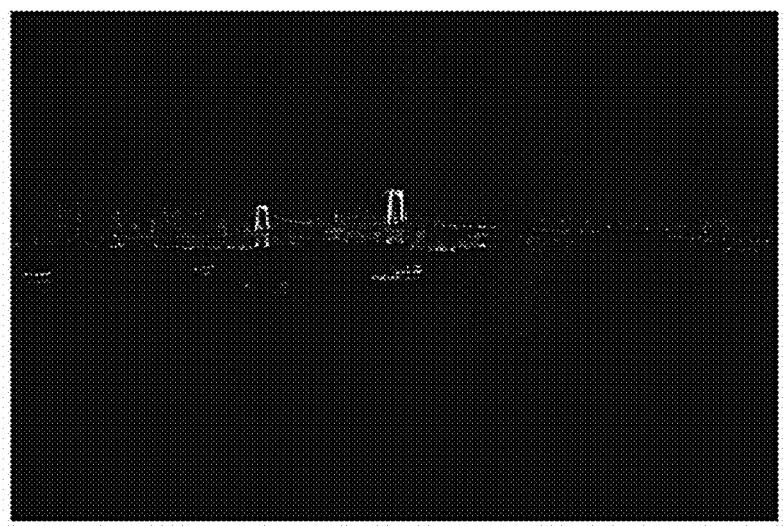
FIG. 11A shows an example of a flash image captured outdoors.

Hereinafter, working effects of the image composition device and the image composition method in accordance with the present embodiment will be described. First, respective characteristics of a no-flash image and a flash image will be described. As for a no-flash image captured without emitting a flash light FL to a subject S, the foreground is brighter when the no-flash image is captured indoors (refer to FIG. 10A). On the other hand, the foreground is darker when the no-flash image is captured outdoors (refer to FIG. 11A). In addition, a color temperature of ambient light is dominant in a color temperature of the no-flash image. Indoor ambient light is often light with a low color temperature such as light from an incandescent light bulb, a candle, or the like.

Figure 10B:
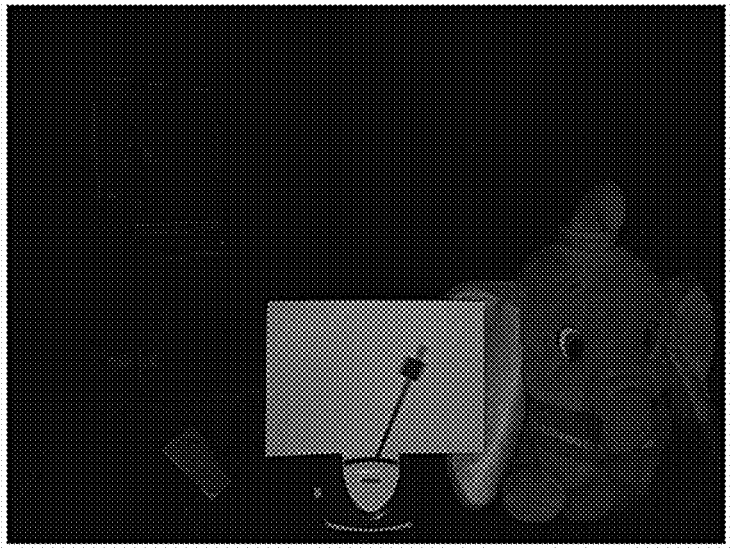
FIG. 10B shows an example of a no-flash image.
Figure 11B:
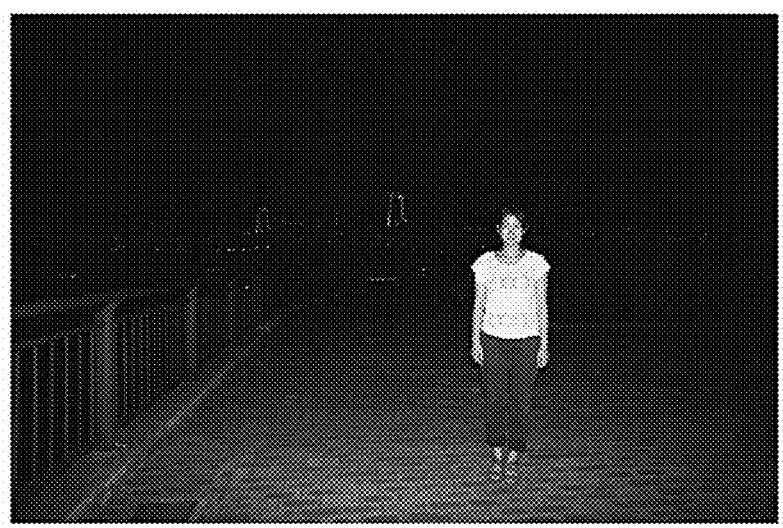
FIG. 11B shows an example of a no-flash image.

On the other hand, with a flash image captured by emitting the flash light FL to the subject S, the foreground including the subject S is bright (refer to FIGS. 10B and 11B). In addition, the background included in the flash image is brighter when the flash image is captured indoors. On the other hand, the background is darker when the flash image is captured outdoors. In addition, a color temperature of the flash light FL is relatively high. Therefore, the color temperature of the flash image is also relatively high.

Figure 10C:
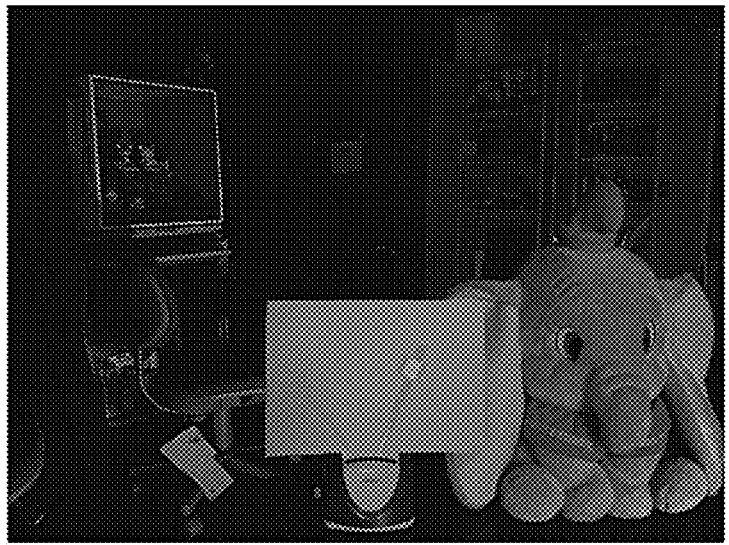
FIG. 10C shows an example of a composite image.
Figure 11C:
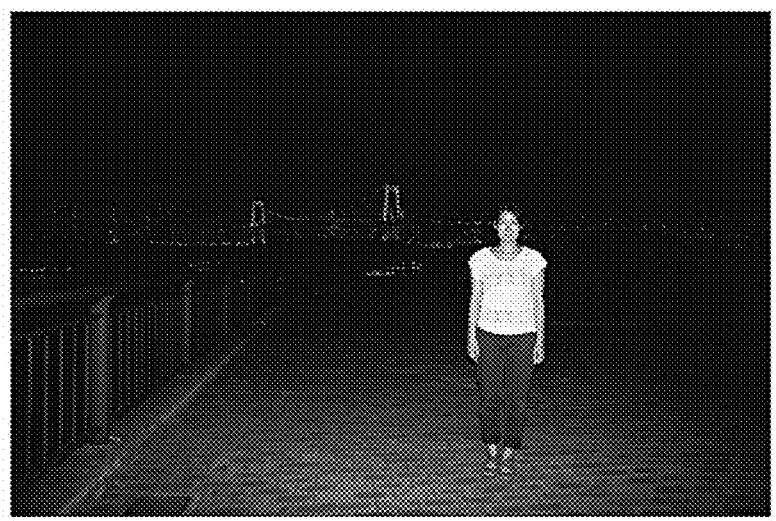
FIG. 11C shows an example of a composite image.

As described above, when the same subject S is captured under light environment conditions that differ from each other, color temperatures included in the respective pieces of image information may differ. Compositing pieces of image information with different color temperatures may not yield a preferable composite image. In consideration thereof, in the image composition device 1, correction for causing the color temperature of a no-flash image to approach the color temperature of a flash image is performed by the correction unit 20. Subsequently, the composition unit 30 composites the no-flash image and the flash image having corrected color temperatures. The color temperature of the no-flash image to be composited has been corrected so as to approach the color temperature of the flash image. Therefore, by compositing the no-flash image and the flash image, a preferable composite image (refer to FIGS. 10C and 11C) can be obtained.

A first pixel and a second pixel are composited by the composition unit 30. The composition ratio that is applied to the composition is determined based on a composition ratio function. The composition ratio function is a function having a composition ratio with a range being larger than 0 and smaller than 1. According to this composition ratio, composite luminance is constituted by the first luminance and the second luminance. Therefore, the composite luminance may take a value between the first luminance and the second luminance. Therefore, in the composite luminance, an occurrence of locations where the composite luminance changes discontinuously can be suppressed and the composite luminance can be changed continuously. As a result, a more preferable composite image (refer to FIGS. 10C and 11C) can be obtained.

In addition, when a difference between the first luminance and the second luminance is small, a more preferable composite image may be obtained by compositing with an emphasis on either one of the luminance of the first luminance and the second luminance. In consideration thereof, in the image composition device 1, the ratio calculation unit 31 calculates a composition ratio using the luminance in addition to a difference in the luminance. By using the luminance, when the difference in luminance is small, composition with an emphasis on either one of the luminance of the first luminance and the second luminance can be performed. As a result, a more preferable composite image can be obtained.

In addition, the correction unit 20 comprises the luminance correction unit 23. By the luminance correction unit 23, luminance of a flash image is increased. As a result, a more preferable composite image can be obtained.

Next, an image composition program for enabling the portable terminal (computer) T to function as the above-mentioned image composition device 1 will be explained.

The image composition program comprises a main module, an input module, and an arithmetic processing module. The main module is a part which integrally controls image processing. The input module operates the portable terminal T so as to acquire images. The arithmetic processing module has the input unit 10, the correction unit 20, and the composition unit 30. Functions realized by executing the main module, the input module, and the arithmetic processing module are respectively similar to the functions of the input unit 10, the correction unit 20, and the composition unit 30 of the image composition device 1 described above.

The image processing program is provided by a recording medium such as a ROM or a semiconductor memory, for example. The image processing program may also be provided as data signals through a network.

Moreover, the embodiment described above represents an example of the image composition device in accordance with the present invention. The image composition device in accordance with the present invention is not limited to the image composition device 1 in accordance with the embodiment, and the image composition device in accordance with the embodiment may be modified or the image composition device in accordance with the present invention may be applied to other embodiments without departing from the spirit and the scope of the invention as set forth in the subjoined claims.

Figure 12:
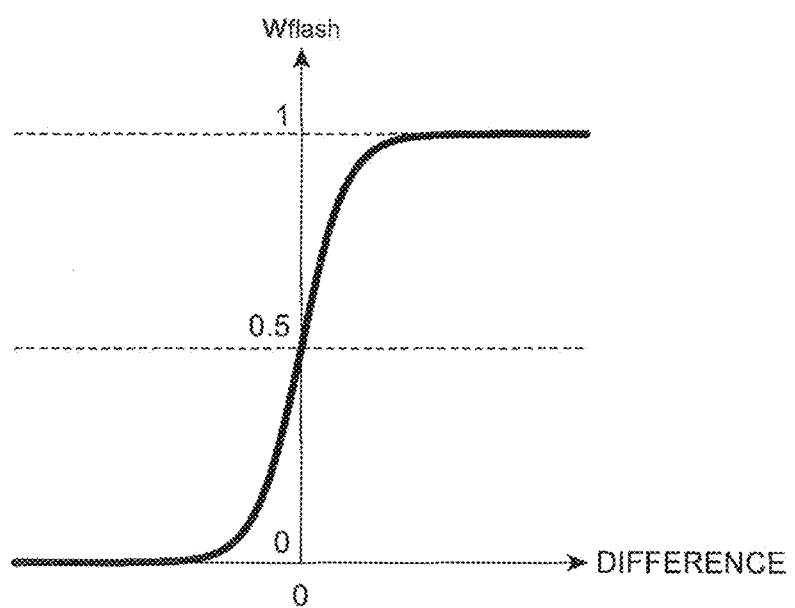
FIG. 12 is a conceptual diagram for explaining steps for calculating a composition ratio in accordance with a modification.

For example, the second light environment condition may include different light emitted from a spot light source or the like in place of a flash light. The image composition device may execute the process by the color temperature conversion unit as necessary. In addition, in the process by the color temperature conversion unit, a color temperature of a flash image may be converted. In this process, the color temperature of the flash image is converted so as to approach a color temperature of a no-flash image. In addition, in the process by the color temperature conversion unit, a color temperature of a flash image may be estimated in addition to estimating a color temperature of a no-flash image. Estimation of the color temperature of the flash image can be executed in similar steps to the estimation of the color temperature of the no-flash image. Furthermore, in the process by the color temperature estimation unit, an algorithm other than binary search can be used. In addition, in the process by the ratio calculation unit, only a difference in luminance may be used as a variable for calculating a composition ratio. A composition ratio function in this case is shown in FIG. 12.

In addition, on the display D, a no-flash image, a flash image, and a composite image may be displayed superimposed on each other and, furthermore, a slider may be displayed together with the images. The slider has a function of changing transparency of each image. The portable terminal T may have a user interface that is capable of showing a change according to composition such as a change caused by the slider in an easily understood manner.

In addition, in the process by the composition operating unit 32, an icon indicating that a composite image is a composition of a no-flash image and a flash image may be added to the composite image. Moreover, this icon is not added to the no-flash image and the flash image. Furthermore, the composition operating unit 32 may output a composite image as well as a no-flash image and a flash image used to generate the composite image to the recording memory M. In this case, when a user determines that the composite image is unnecessary, the user can select and record the no-flash image and the flash image prior to the composition.

Figure 13:
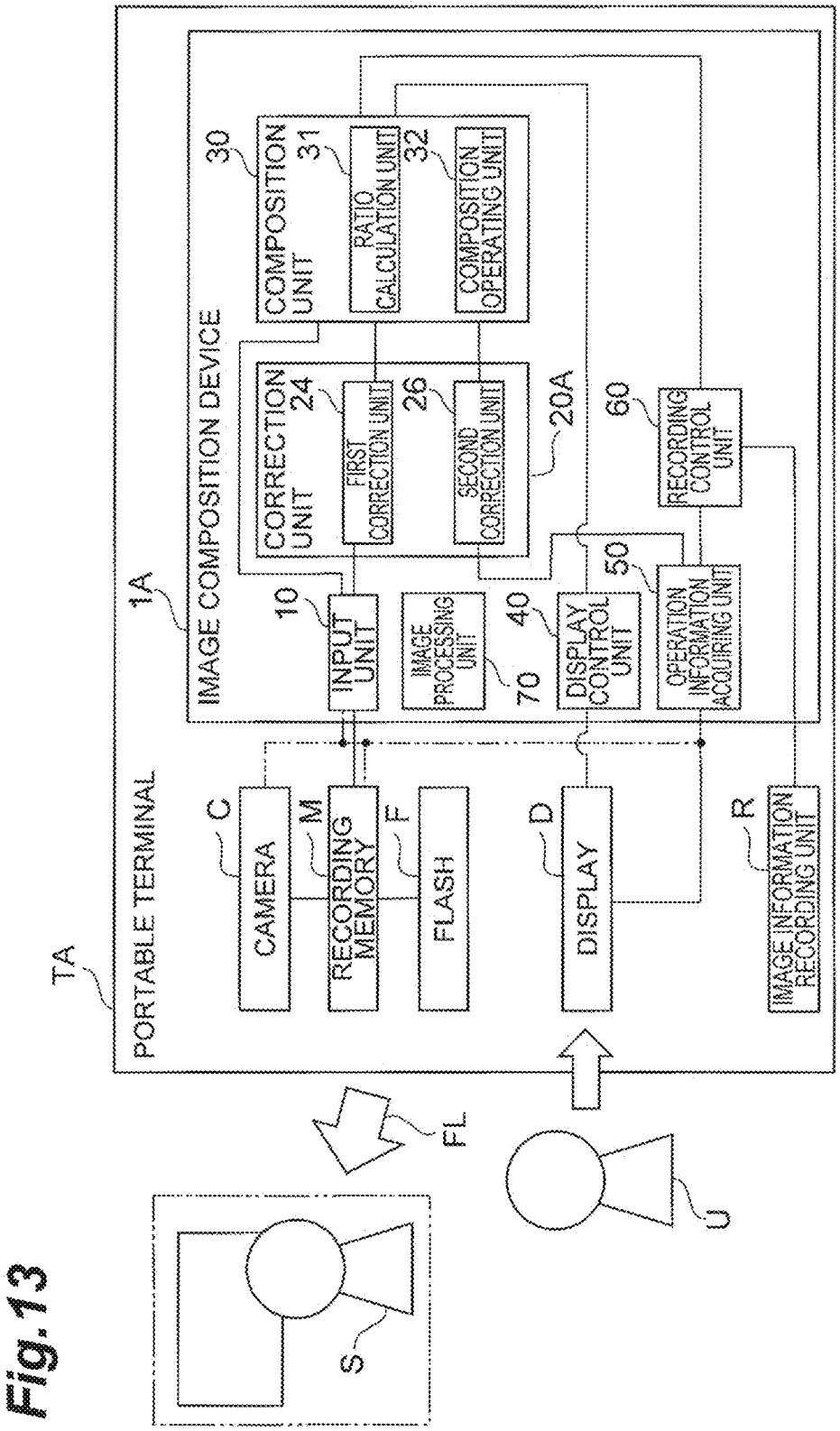
FIG. 13 is a functional block diagram of a portable terminal mounted with an image composition device in accordance with another embodiment.

Furthermore, an image composition device in accordance with another embodiment will be described. An image composition device 1A shown in FIG. 13 provides a composite image suited to preferences of a user U using a portable terminal TA.

The user U may favor an image composited without adjusting a color temperature (hereinafter, also referred to as an "unadjusted image" (an image related to second composite image information)) over an image composited by automatically adjusting a color temperature (hereinafter, also referred to as an "automatically adjusted image" (an image related to first composite image information)). For example, there is a case where a color of lighting that illuminates a background is unique (illumination or the like) and the lighting color is desirably reflected onto a composite image. In this case, the image composition device 1A causes an automatically adjusted image and an unadjusted image to be displayed on the display D. Subsequently, the image composition device 1A allows the user U to select a preferred image.

In addition, the user U may desire to adjust an image to suit his/her preferences. By the image composition device 1 shown in FIG. 1, after a color temperature of a no-flash image is adjusted so as to approach a color temperature of a flash image, the flash image and the no-flash image having an adjusted color temperature are automatically composited. A process of correcting a color temperature of one image to a color temperature of the other image and compositing the images as described above will be referred to as an "automatic compositing process". When adjusting a color temperature, the image composition device 1A adjusts at least one of a color temperature of a flash image and a color temperature of a no-flash image to a color temperature specified by the user U. In addition, the image composition device 1A uses the flash image and the no-flash image having an adjusted color temperature to generate a composite image suited to preferences of the user U (hereinafter, also referred to as a "user-adjusted image" (an image related to third composite image information)).

Hereinafter, a configuration of the image composition device 1A will be described. Note that components shared with the image composition device 1 will be denoted by the same reference characters and the description thereof will be omitted. As shown in FIG. 13, in addition to a camera C, a recording memory M, a flash F, a display (image display unit) D, and the image composition device 1A, the portable terminal TA also comprises an image information recording unit R. The image information recording unit R records a plurality of pieces of image information. The image information recording unit R is, for example, a large-capacity recording medium such as a memory card and a hard disk.

In addition to an input unit 10, a correction unit 20A, and a composition unit 30, the image composition device 1A also comprises a display control unit 40, an operation information acquiring unit 50, a recording control unit 60, and an image processing unit 70.

In addition to being connected to the recording memory M, the camera C, and the correction unit 20A, the input unit 10 is also connected to the composition unit 30. The input unit 10 outputs a no-flash image and a flash image to the composition unit 30 in addition to the correction unit 20A. The image processing unit 70 performs prescribed image processing on a no-flash image, a flash image, an unadjusted image, an automatically adjusted image, and the like. The prescribed image processing includes, for example, a facial detection process.

Figure 14:
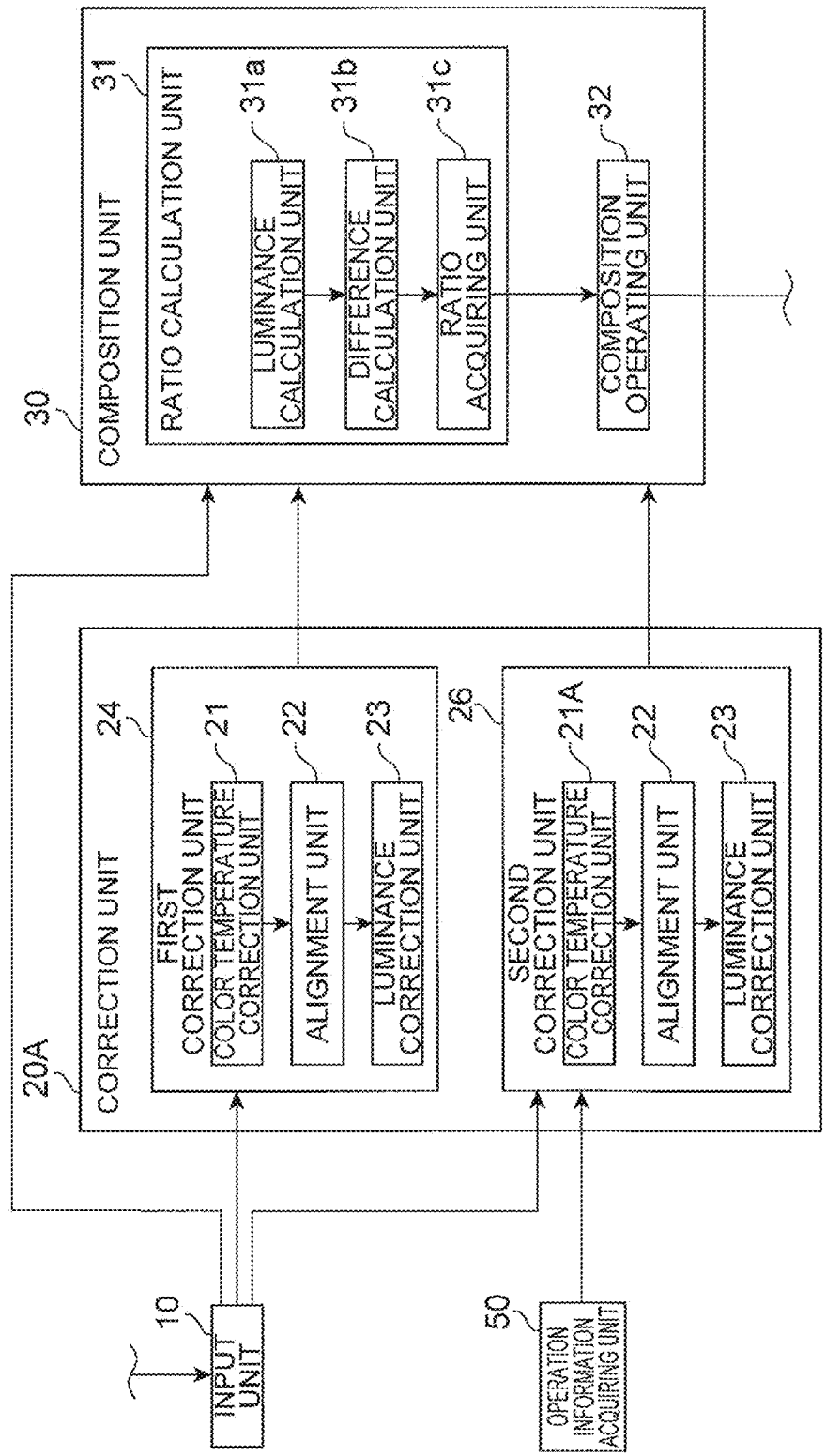
FIG. 14 is a functional block diagram of an image composition device in accordance with another embodiment.

The correction unit 20A includes a first correction unit 24 and a second correction unit 26. As shown in FIG. 14, the first correction unit 24 includes a color temperature correction unit 21, an alignment unit 22, and a luminance correction unit 23. The first correction unit 24 corrects a color temperature of one of a flash image and a no-flash image so as to approach a color temperature of the other of the flash image and the no-flash image. The second correction unit 26 includes a color temperature correction unit 21A, the alignment unit 22, and the luminance correction unit 23. Target color temperature information is input to the second correction unit 26 from the operation information acquiring unit 50. The second correction unit 26 corrects a color temperature of at least one of a flash image and a no-flash image based on the target color temperature information.

The composition unit 30 includes a ratio calculation unit 31 and a composition operating unit 32. Information output from the input unit 10, information output from the first correction unit 24, and information output from the second correction unit 26 are input to the composition unit 30. The composition unit 30 generates an automatically adjusted image using information output from the first correction unit 24. The composition unit 30 generates an unadjusted image using information output from the input unit 10. The composition unit 30 generates a user-adjusted image using information output from the second correction unit 26.

Figure 17A:
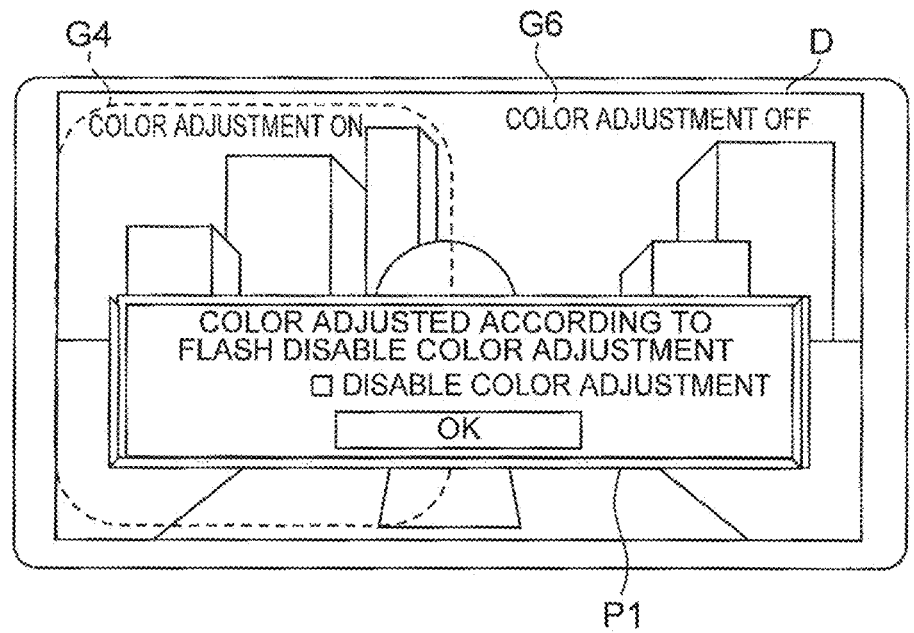
FIG. 17A and FIG. 17B show examples of an image displayed on a display of a portable terminal.

As shown in FIG. 13, the display control unit 40 is connected to the composition unit 30 and the display D. The display control unit 40 causes an image related to image information output from the composition unit 30 to be displayed on the display D. For example, as shown in FIG. 17A, the display control unit 40 may divide a region of the display D and display an automatically adjusted image G4 in one of the divided regions and display an unadjusted image G6 in another divided region. In addition, the display control unit 40 causes an operation image P1 (refer to FIG. 17A), an operation image P2 (refer to FIG. 17B), and an operation image P3 (refer to FIG. 18) to be displayed on the display D. The user U inputs operation information by touching the operation images P1, P2, and P3.

Figure 19:
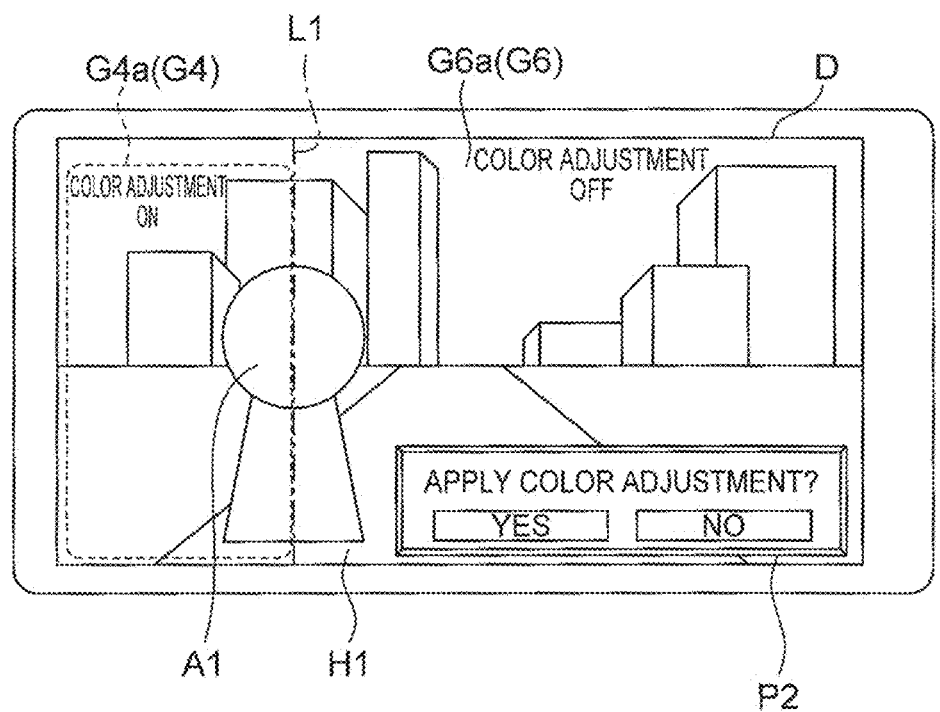
FIG. 19 shows an example of an image displayed on a display of a portable terminal.

As shown in FIG. 19, the display control unit 40 may cause a first divided image G4a, a second divided image G6a, and a boundary line L1 to be displayed on the display D. The boundary line L1 indicates a boundary between the first divided image G4a and the second divided image G6a. The first divided image G4a is a part of an image related to the unadjusted image G6. The second divided image G6a is a part of an image related to the automatically adjusted image G4. In addition, the first divided image G4a and the second divided image G6a respectively include a part of a feature region A1. In other words, the feature region A1 is divided by the boundary line L1 into a part included in the first divided image G4a and a part included in the second divided image G6a. A region occupied by a face of a person, an illumination source, reflected illumination light, or the like in an image may be used as a reference when a user determines color on an output image. The feature region A1 in the image described above signifies a region that is likely used as a reference when a user determines color on an output image. Therefore, by arranging a part of the feature region A1 as the automatically adjusted image G4 and another part as the unadjusted image G6, a more preferable comparison of image colors can be performed.

For example, let us assume that the feature region A1 including a face of a person in an image is divided by the boundary line L1 into the first divided image G4a and the second divided image G6a. This image configuration presents the user U with a display mode in which a region including the face of a person is divided into a region with color adjustment and a region without color adjustment. Therefore, the image composition device 1A enables the user U to select one of a composite image (the first divided image G4a) having a color temperature adjusted so that a facial color (skin tone) appears natural and a composite image (the second divided image G6a) having an unadjusted color temperature. As a result, when the user U prefers to have a natural skin color on the face, the user U is likely to select the first divided image G4a. On the other hand, when the user U thinks that there is an element having a higher priority than the skin color of the face and the skin color of the face is permissible, the user U is likely to select the second divided image G6a. For example, when a tint of lighting that is present behind a person is prioritized over the skin color of the face, the user U is likely to select the second divided image G6a.

The feature region A1 is not limited to a region occupied by a person. For example, the feature region A1 may be a region occupied by illumination light. In this case, an image configuration in which a region occupied by the illumination light is divided into a region with color adjustment and a region without color adjustment is to be displayed on the display D. When the user U prefers to have the tint of the illumination light in the output, the user U is likely to select the first divided image. On the other hand, when there is an element having a higher priority than the tint of the illumination light and the tint of the illumination light is permissible, the user U is likely to select the second divided image.

For an image having a person H1 captured therein, the boundary line L1 is set so as to overlap with the person H1. The boundary line L1 may be set by the user U or may be set automatically. When the user U sets the boundary line L1, the user U specifies the feature region A1. Next, the display control unit 40 sets the boundary line L1 so as to divide the region specified by the user U into two regions. In addition, when setting the boundary line L1, the image processing unit 70 performs a facial detection process on the image. Next, the display control unit 40 sets the boundary line L1 so as to divide the region extracted as a face into two regions. Alternatively, when the boundary line L1 is automatically set, the image processing unit 70 extracts a region in a no-flash image in which a concentration of pixels with higher luminance values than a threshold is equal to or higher than a prescribed concentration. This region corresponds to an illumination source. Next, the display control unit 40 sets the boundary line L1 so as to divide the extracted region into two regions.

The boundary line L1 may be freely moved to a position as desired by the user U. Alternatively, the display control unit 40 may adopt a trajectory drawn by a fingertip of the user U on the display D as the boundary line L1. The display control unit 40 may have the user U freely set a position and a region of the automatically adjusted image G4.

As shown in FIG. 13, the operation information acquiring unit 50 is connected to the display D, the correction unit 20A, and the recording control unit 60. The operation information acquiring unit 50 acquires operation information created by an operation performed by the user U on the operation images P1, P2, and P3. Subsequently, the operation information acquiring unit 50 outputs the acquired operation information to the correction unit 20A and the recording control unit 60. Therefore, in the image composition device 1A, the display D constitutes an input device. Alternatively, the input device may be a physical operating key or the like provided on the portable terminal TA. In this case, the operation information acquiring unit 50 is connected to the operating key. In addition, the operation information acquiring unit 50 acquires operation information created by an operation performed by the user U on the operating key.

In this case, operation information includes image specifying information and target color temperature information. Image specifying information refers to information that specifies any one of a flash image, a no-flash image, an automatically adjusted image, an unadjusted image, and a user-adjusted image. When a "Disable color adjustment" box is checked on the operation image P1 (refer to FIG. 17A), the image specifying information includes information specifying an unadjusted image. In addition, target color temperature information refers to information for correcting a color temperature of at least one of a flash image and a no-flash image. For example, the operation image P3 (refer to FIG. 18) includes two slide bars P3a and P3b. A position along a lateral direction of the slide bars P3a and P3b corresponds to a color temperature. In an initial display of the operation image P3, positions of the slide bars P3a and P3b correspond to color temperatures of a flash image and a no-flash image prior to adjusting color temperatures. By moving the slide bars P3a and P3b, color temperatures when compositing the flash image and the no-flash image are specified. When color temperatures upon composition are adjusted, an appearance of an obtained user-adjusted image changes. The user U adjusts positions of the slide bars P3a and P3b while checking the user-adjusted image so that an image suiting the preferences of the user U is produced.

The recording control unit 60 is connected to the operation information acquiring unit 50, the composition unit 30, and the image information recording unit R. Based on image specifying information input from the operation information acquiring unit 50, the recording control unit 60 specifies image information to be recorded from respective pieces of image information input from the composition unit 30. In addition, the recording control unit 60 outputs the specified image information to the image information recording unit R and causes the image information to be recorded.

Figure 15:
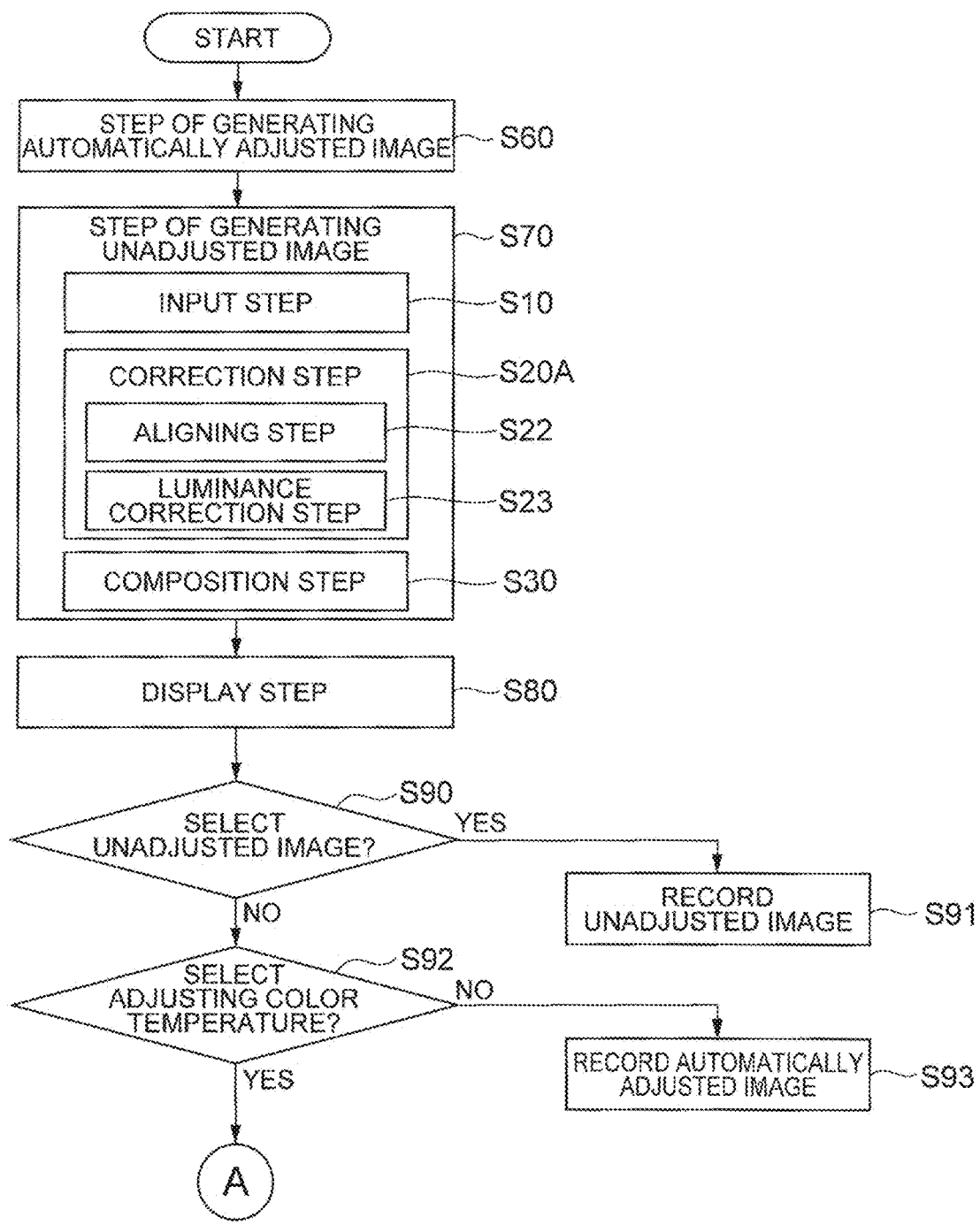
FIG. 15 is a flow chart explaining operations of an image composition device in accordance with another embodiment.
Figure 16:
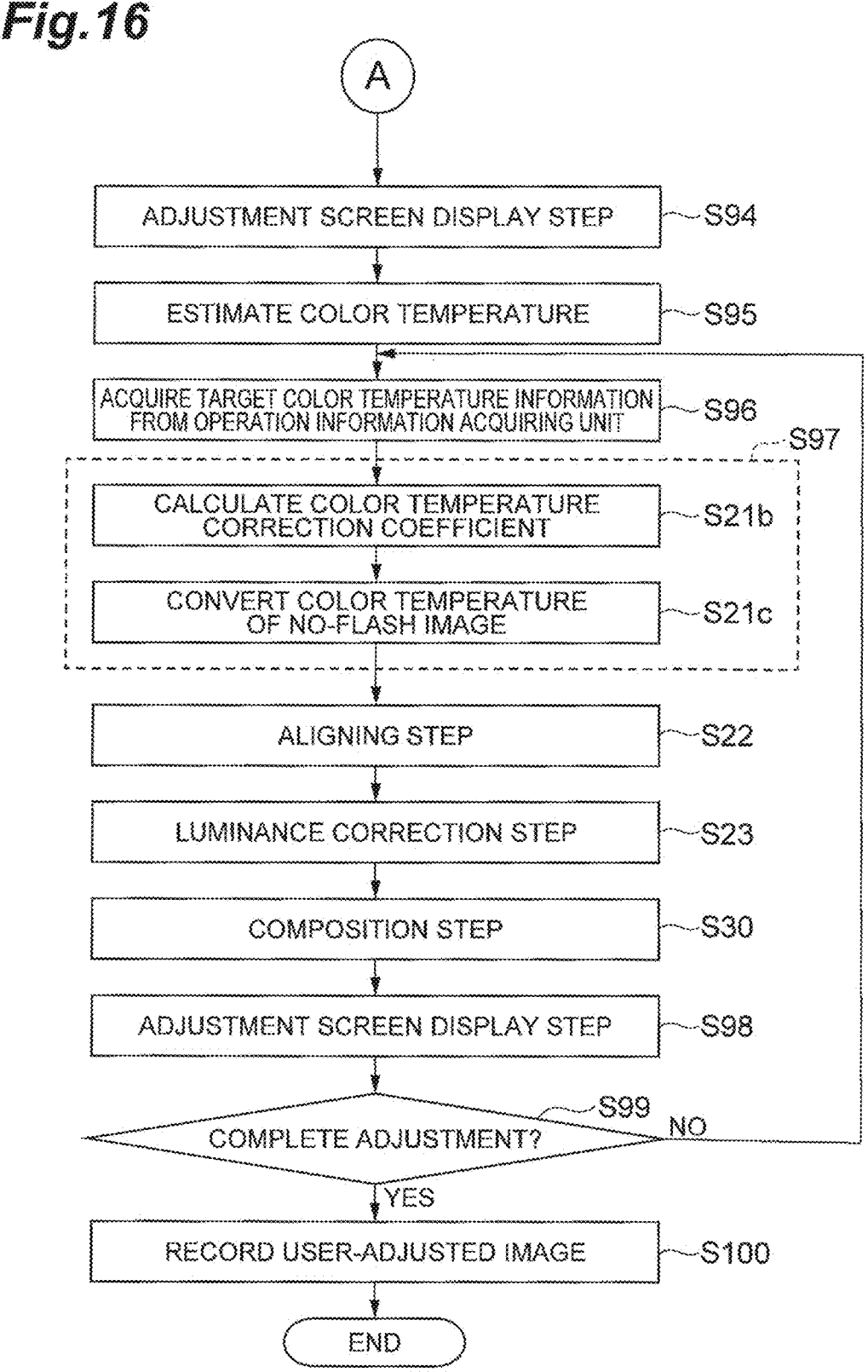
FIG. 16 is a flow chart explaining operations of an image composition device in accordance with another embodiment.

Next, operations of the image composition device 1A will be described with reference to FIGS. 15 and 16. First, the image composition device 1A executes step S60 in which an automatically adjusted image is generated. Step S60 includes an input step S10, a correction step S20, and a composition step S30. After step S60 in which an automatically adjusted image is generated, step S70 for generating an unadjusted image is executed. Step S70 includes the input step S10, a correction step S20A, and the composition step S30. The correction step S20A differs from the correction step S20 in that a color temperature correction step S21 is not included. In other words, in step S20A, the alignment unit 22 executes aligning of a flash image and a no-flash image (step S22). In addition, after the aligning step S22, the luminance correction unit 23 executes the luminance correction step S23. Subsequently, the composition unit 30 executes the composition step S30.

After step S70 in which an unadjusted image is generated, the display control unit 40 executes a display step S80. The display control unit 40 causes the automatically adjusted image G4 and the unadjusted image G6 to be displayed on the display D. Furthermore, the display control unit 40 causes the operation image P1 to be displayed on the display D.

Next, the operation information acquiring unit 50 executes step S90 in which image specifying information is acquired. As shown in FIG. 17A, when the user U selects the unadjusted image G6 (step S90: YES), the recording control unit 60 causes the unadjusted image G6 to be recorded in the image information recording unit R (step S91). On the other hand, when the user U does not select the unadjusted image G6 on the screen shown in FIG. 17A (step S90: NO), a transition is made to next step S92.

Figure 17B:
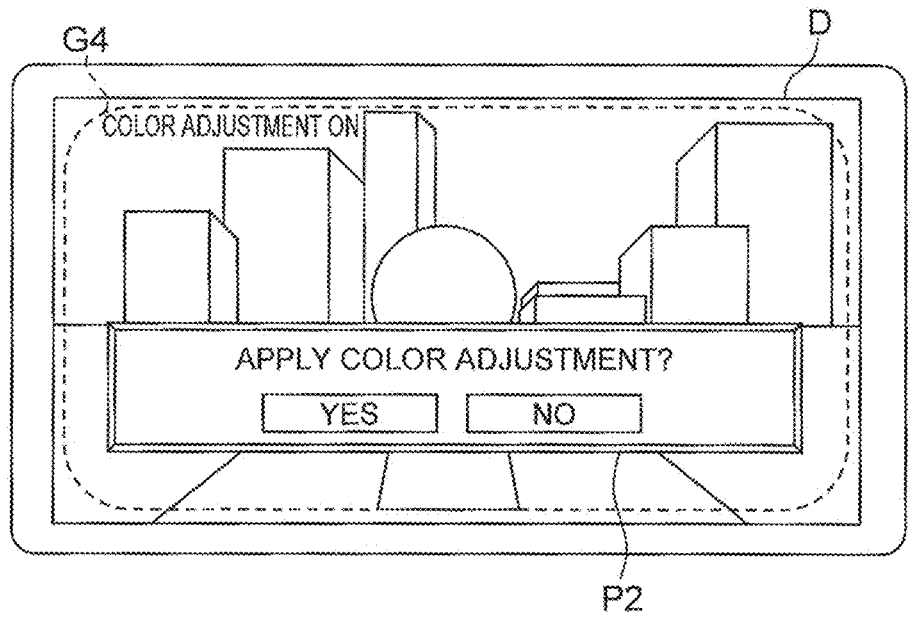

Next, as shown in FIG. 17B, the display control unit 40 causes the operation image P2 that inquires whether or not an adjustment of a color temperature is to be performed on the display D. When the user U does not select adjusting the color temperature (step S92: NO), the recording control unit 60 causes the automatically adjusted image G4 to be recorded in the image information recording unit R (step S93). On the other hand, when the user U selects adjusting the color temperature (step S92: YES), a transition is made to next step S94.

Figure 18:
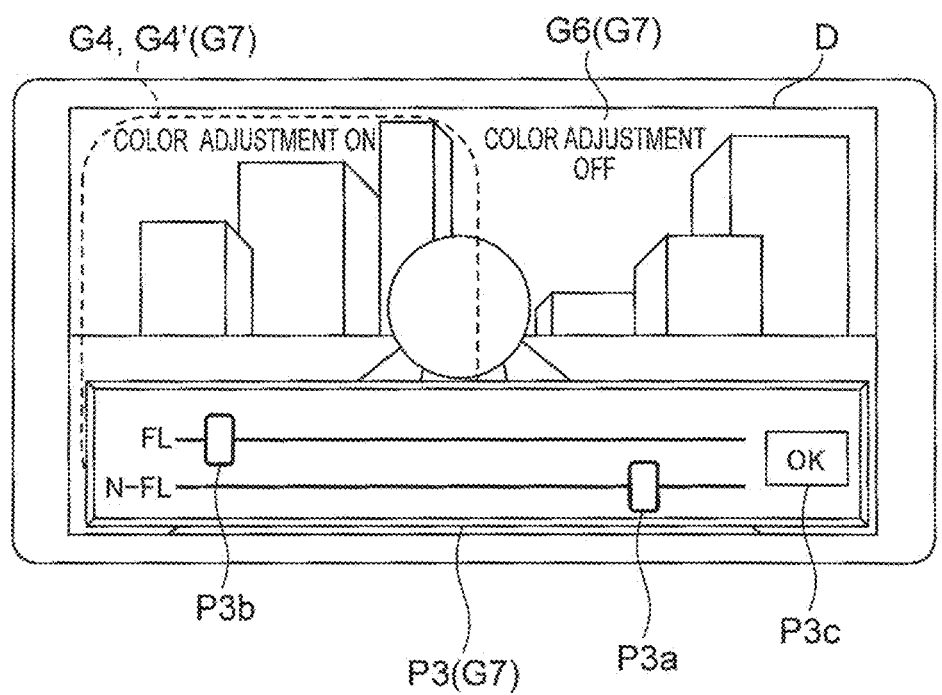
FIG. 18 shows an example of an image displayed on a display of a portable terminal.

Next, the display control unit 40 executes step S94 in which an adjustment screen G7 is displayed. As shown in FIG. 18, the display control unit 40 causes the automatically adjusted image G4 and the unadjusted image G6 to be displayed on the display D. Furthermore, the display control unit 40 causes the operation image P3 for adjusting a color temperature to be displayed on the display D.

Next, the color temperature estimating unit 21a executes step S95 in which a color temperature of a no-flash image is estimated.

Next, let us assume that the user U moves the slide bar P3a that adjusts the color temperature of the no-flash image. As a result, the operation information acquiring unit 50 acquires target color temperature information (step S96). The target color temperature information corresponds to a position of the slide bar P3a. The color temperature correction unit 21 corrects the color temperature of the no-flash image so as to approach the target color temperature (step S97).

Although this correction is executed using a similar method to the correction of a color temperature that is executed in the image composition device 1, there is a difference in data to be used. Specifically, in the image composition device 1, a correction coefficient that causes a ratio of RGB components of a no-flash image to approach a ratio of RGB components of a flash image is calculated. The image composition device 1A calculates a correction coefficient that causes a ratio of RGB components of a no-flash image to approach a ratio of RGB components represented by the target color temperature.

Specifically, first, the color temperature correction coefficient calculating unit 21b executes step S21b in which a color temperature correction coefficient is calculated. More specifically, a ratio of an R component, a G component, and a B component in a shrunken image of a no-flash image is calculated using a color temperature of the no-flash image estimated in step S95 and the graph shown in FIG. 6. Next, a ratio of the R component, the G component, and the B component at a target color temperature is calculated using target color temperature information and the graph shown in FIG. 6. Then, a color temperature correction coefficient is calculated using a ratio of the R component, the G component, and the B component of the no-flash image and a ratio of the R component, the G component, and the B component at the target color temperature. After step S21b in which a color temperature correction coefficient is calculated, the color temperature converting unit 21c executes step S21c in which a color temperature is converted.

Next, the alignment unit 22 executes the aligning step S22. Subsequently, after the aligning step S22, the luminance correction unit 23 executes the luminance correction step S23. Then, the composition unit 30 executes the composition step S30. In the composition step S30, the no-flash image and the flash image processed in the correction step S97 are composited to generate a user-adjusted image G4'.

Next, the display control unit 40 causes the unadjusted image G6 and the user-adjusted image G4' to be displayed on the display D (step S98) (refer to FIG. 18). The user U checks the user-adjusted image G4' to determine whether a composite image suiting the preferences of the user U has been obtained. Operation information related to this determination is obtained by an operation of a button P3c that is caused to be displayed on the display D by the display control unit 40. At this point, when the user U determines that the adjustment has not been concluded (step S99: NO), the user U once again moves the slide bar P3a. Subsequently, the image composition device 1A once again executes steps S96, S97, S22, S23, S30, and S98. On the other hand, when the user U determines that the adjustment has been concluded (step S99: YES), the recording control unit 60 causes the user-adjusted image G4' to be recorded in the image information recording unit R (step S100).

According to the image composition device 1A, a composite image that better suits the preferences of the user U can be provided.

Moreover, the embodiment described above represents an example of the image composition device in accordance with the present invention. The image composition device in accordance with the embodiment may be modified or the image composition device in accordance with the present invention may be applied to other embodiments without departing from the spirit and the scope of the invention as set forth in the subjoined claims.

Figure 20A:
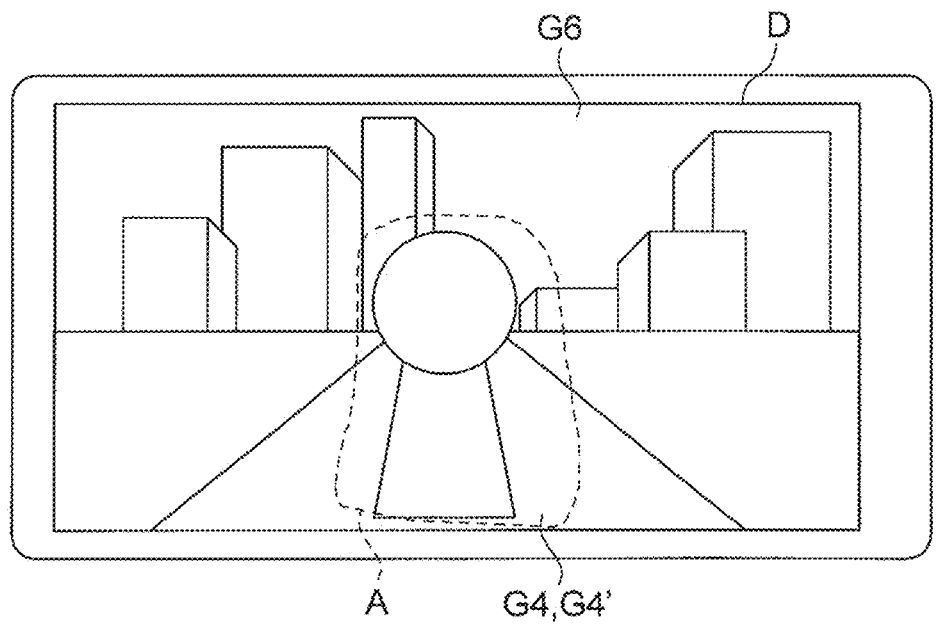
FIG. 20A and FIG. 20B show examples of an image displayed on a display of a portable terminal.

The image composition device 1A adjusts a color temperature in all regions of the no-flash image and composites the no-flash image with a flash image. For example, the image composition device 1A may generate a composite image (an image related to fourth composite image information) that includes a part (third divided image) composited without adjusting a color temperature and a part (fourth divided image) composited after adjusting a color temperature. For example, as shown in FIG. 20A, first, the display control unit 40 causes the unadjusted image G6 to be displayed on the display D. Next, the user U specifies a region A that is desirably composited after adjusting a color temperature. Information related to the region A is acquired by the operation information acquiring unit 50. Next, the operation information acquiring unit 50 outputs information representing the region A to the image processing unit 70. The fourth divided image may be a part of first composite image information that is composited after a color temperature is automatically adjusted or a part of third composite image information that is composited after the color temperature is adjusted to a color temperature specified by the user.

Figure 20B:
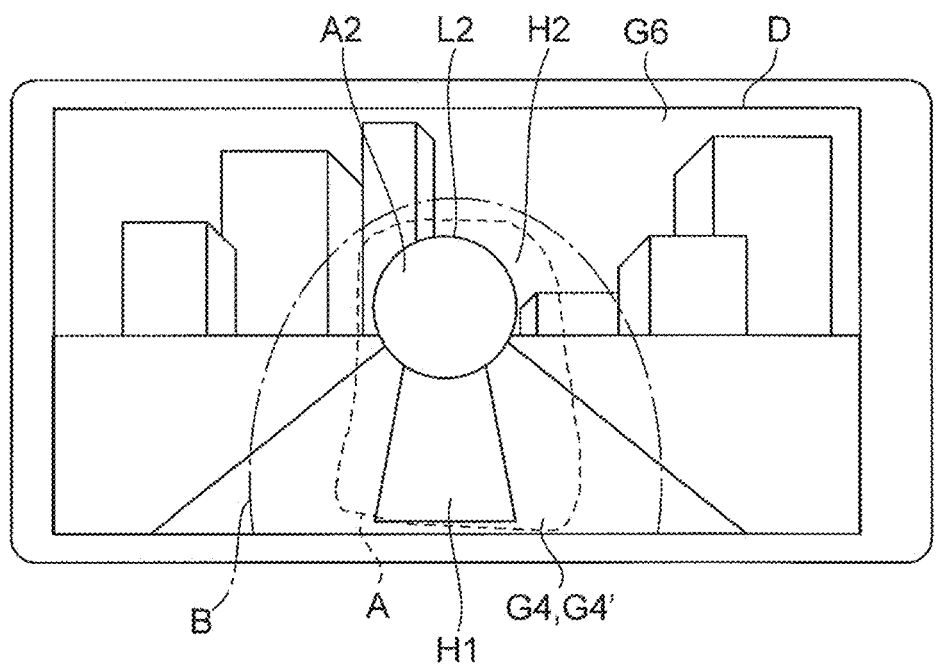

In this case, the region A specified by the user U may include a part suited for adjustment of a color temperature and a part unsuited for adjustment of a color temperature. In consideration thereof, the image processing unit 70 may adjust an area occupied by the region A so that a large proportion of the part suited for adjustment of the color temperature (or the part unsuited for adjustment of the color temperature) is included in the region A. As shown in FIG. 20B, the region A includes a region occupied by a person H1 which is suited for adjustment of a color temperature and a region occupied by a background H2 which is unsuited for adjustment of a color temperature. Therefore, first, the user U specifies a region A including the person H1. Next, the image processing unit 70 sets an expanded region B which is larger than the region A specified by the user U and which includes the region A. Then, a continuous line where a change in a luminance value reaches maximum in the expanded region B is calculated. A luminance value of the unadjusted image G6 is used for this process. Moreover, in the unadjusted image G6, for a pixel with a large proportion of components of a flash image, a luminance value of the flash image may be used. On the other hand, for a pixel with a small proportion of components of a flash image, a luminance value of the no-flash image may be used. In other words, for a pixel with a large proportion of components of a no-flash image, a luminance value of the no-flash image is used. Subsequently, the image processing unit 70 sets a closed region enclosed by the continuous line as an adjusted composite region (fourth divided image) A2. According to the process, when the user U sets the region A so as to enclose the person H1, the expanded region B enclosing the region A is automatically set. The continuous line where a change in a luminance value reaches maximum is a boundary line L2 between the person H1 and the background H2. Therefore, in this example, the closed region enclosed by the continuous line is a region occupied by the person H1.

For example, the region A is not limited to being specified by the user U and may be automatically set by software. Accordingly, a color temperature is adjusted and a flash image and a no-flash image are composited inside the region A while a flash image and a no-flash image are composited without adjusting a color temperature outside the region A. In this case, when generating the region A, a color temperature may be automatically adjusted or may be adjusted by the user U. According to this configuration, a composite image better suiting the preferences of the user U can be obtained.

For example, while the image composition device 1A causes an unadjusted image and an automatically adjusted image to be displayed on the display D, a display mode of the present invention is not limited to such mode. For example, in step S80, the image composition device 1A may cause only an automatically adjusted image to be displayed on the display D and may issue an inquiry to the user U. In addition, for example, in step S98, the image composition device 1A may cause the user-adjusted image G4' and the operation image P3 to be displayed on the display D and have the user U adjust a color temperature.

Figure 21:
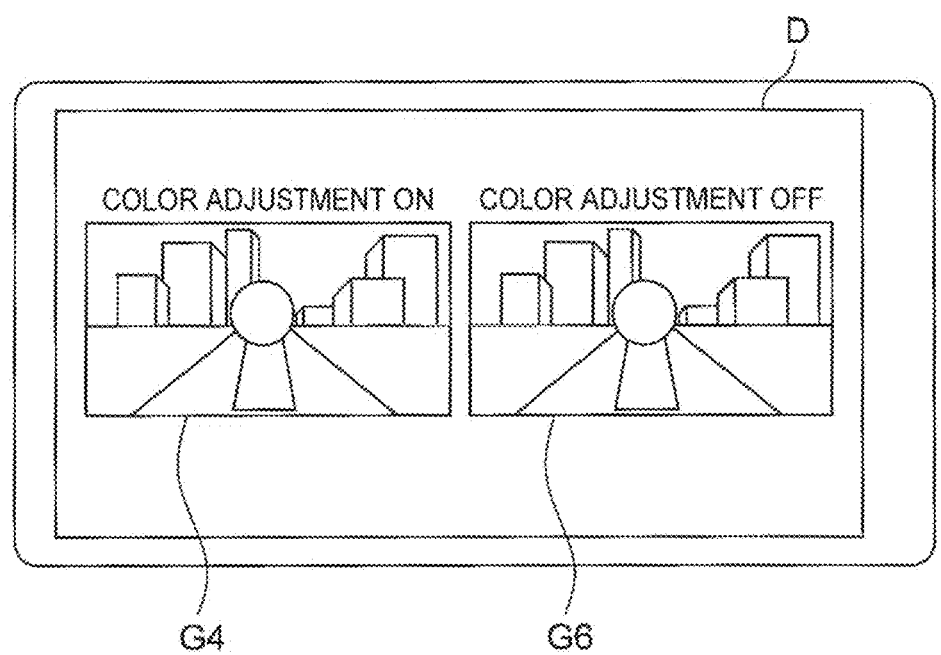
FIG. 21 shows an example of an image displayed on a display of a portable terminal.

For example, when causing an unadjusted image and an automatically adjusted image to be displayed on the display D, the image composition device 1A causes one image including a region having an adjusted color temperature and a region having an unadjusted color temperature to be displayed. For example, as shown in FIG. 21, the image composition device 1A may cause one unadjusted image G6 and one automatically adjusted image G4 to be respectively displayed on the display D.

For example, the image composition device 1A has a configuration that enables the automatically adjusted image G4 and the unadjusted image G6 to be selected and a configuration that allows the user U to adjust a color temperature. Alternatively, the image composition device may have a configuration that enables the automatically adjusted image G4 and the unadjusted image G6 to be selected and a configuration that does not allow the user U to adjust a color temperature. Alternatively, the image composition device may have a configuration that allows the user U to adjust a color temperature and a configuration that does not enable the automatically adjusted image G4 and the unadjusted image G6 to be selected.

For example, the image composition device 1A may execute step S92 that inquires whether or not an adjustment of a color temperature is desired before step S60 in which an automatically adjusted image is generated.

The boundary line L1 divides the feature region A1 into the first divided image G4a and the second divided image G6a. In addition, the first divided image G4a and the second divided image G6a respectively include a part of the feature region A1. For example, the boundary line L1 may only divide the feature region A1. In this case, the feature region A1 is formed by the first divided image G4a and the second divided image G6a. In other words, the first divided image G4a and the second divided image G6a do not include a region other than the feature region A1. Specifically, the image composition device 1A divides a display region of the display D into two regions using the boundary line L1. As an example, the boundary line L1 is set so as to pass through a face of a person. Next, the image composition device 1A causes the user U to specify an object range (a region A) of color adjustment. As a result, an image in which a region occupied by the person H1 is enclosed by a boundary line L2 is displayed on the display D. The region enclosed by the boundary line L2 is the feature region A1 and is divided into the first divided image G4a and the second divided image G6a by the boundary line L1.

The feature region A1 is divided by the boundary line L1 into a region having an adjusted color temperature and a region having an unadjusted color temperature. The region having an adjusted color temperature may be a region in which a color temperature is automatically adjusted. Alternatively, the region having an adjusted color temperature may be a region in which a color temperature is adjusted by the user.

The aspects of the intention described below represent examples of the present invention.

An image composition device for generating a composite image information including a subject by compositing first image information including the subject captured under a first light environment condition and second image information including the subject captured under a second light environment condition that differs from the first light environment condition, the device comprising:

an input unit configured to input the first image information and the second image information; and a composition unit configured to generate the composite image information by compositing the first image information and the second image information input from the input unit, wherein the composition unit:

calculates a difference between a first pixel value of a first composited pixel which constitutes the first image information and a second pixel value of a second composited pixel which constitutes the second image information and corresponds to the first composited pixel; and calculates a composition ratio representing a proportion of the first pixel value to a composite pixel value of a composite pixel which constitutes the composite image information, based on the difference and a composition ratio function, and the composition ratio function defines a relationship between the difference and the composition ratio and includes a range in which the composition ratio is larger than 0 and smaller than 1.

An image composition method of using a computer to perform a process for generating composite image information including a subject by compositing first image information including the subject captured under a first light environment condition and second image information including the subject captured under a second light environment condition that differs from the first light environment condition, the method comprising:

an inputting step of inputting the first image information and the second image information; and a compositing step of generating the composite image information by compositing the first image information and the second image information input in the inputting step, wherein in the compositing step:

a difference between a first pixel value of a first composited pixel which constitutes the first image information and a second pixel value of a second composited pixel which constitutes the second image information and corresponds to the first composited pixel is calculated; and a composition ratio representing a proportion of the first pixel value to a composite pixel value of a composite pixel which constitutes the composite image information is calculated, based on the difference and a composition ratio function, and the composition ratio function defines a relationship between the difference and the composition ratio and includes a range in which the composition ratio is larger than 0 and smaller than 1.

A computer-readable recording medium recording an image composition program which causes a computer to function so as to perform a process of generating composite image information including a subject by compositing first image information including the subject captured under a first light environment condition and second image information including the subject captured under a second light environment condition that differs from the first light environment condition, the program recorded on the computer-readable recording medium causing the computer to function as:

an input unit configured to input the first image information and the second image information; and a composition unit configured to generate the composite image information by compositing the first image information and the second image information input from the input unit, wherein the composition unit:

calculates a difference between a first pixel value of a first composited pixel which constitutes the first image information and a second pixel value of a second composited pixel which constitutes the second image information and corresponds to the first composited pixel; and calculates a composition ratio representing a proportion of the first pixel value to a composite pixel value of a composite pixel which constitutes the composite image information, based on the difference and a composition ratio function, and the composition ratio function defines a relationship between the difference and the composition ratio and includes a range in which the composition ratio is larger than 0 and smaller than 1.

What is claimed is:

1. An image composition device for generating composite image information of a subject, the image composition device comprising at least one processor configured to:

receive first image information of the subject captured under a first light environment condition and second image information of the subject captured under a second light environment condition that differs from the first light environment condition, wherein the first image information comprises a first pixel associated with a first pixel value, and the second image information comprises a second pixel corresponding to the first pixel in the first image information;

correct the second image information, wherein the second pixel having been corrected is associated with a second pixel value; and determine a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and determine a composite pixel value for the composite pixel of the composite image information based on the first pixel value, the second pixel value and the composition ratio function.

2. The image composition device according to claim 1, wherein determining the composite pixel value comprises: calculating the composition ratio, based on a difference between the first pixel value and the second pixel value, and on the composition ratio function, and wherein the composition ratio function defines a relationship between the difference and the composition ratio and includes a range in which the composition ratio is larger than 0 and smaller than 1.

3. The image composition device according to claim 1, wherein
the second image information is captured by emitting a flash light to the subject, and
the at least one processor is further configured to calculate a luminance correction coefficient and to correct a luminance of the second image information using the luminance correction coefficient.

4. An image composition method for generating composite image information of a subject, the image composition method being executable by a computer and comprising:
receiving first image information of the subject captured under a first light environment condition and second image information of the subject captured under a second light environment condition that differs from the first light environment condition, wherein the first image information comprises a first pixel associated with a first pixel value, and the second image information comprises a second pixel corresponding to the first pixel in the first image information;
correcting the second image information, wherein the second pixel having been corrected is associated with a second pixel value;
determining a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and
determining a composite pixel value for the composite pixel of the composite image information based on the first pixel value, the second pixel value and the composition ratio function.

5. A computer-readable recording medium having recorded thereon an image composition program for generating composite image information of a subject,
the image composition program being executable by a computer to:
receive first image information of the subject captured under a first light environment condition and second image information of the subject captured under a second light environment condition that differs from the first light environment condition, wherein the first image information comprises a first pixel associated with a first pixel value, and the second image information comprises a second pixel corresponding to the first pixel in the first image information;
correct the second image information, wherein the second pixel having been corrected is associated with a second pixel value;
determine a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and
determine a composite pixel value for the composite pixel of the composite image information based on the first pixel value, the second pixel value and the composition ratio function.

6. An image composition device for generating composite image information of a subject, the image composition device comprising at least one processor configured to:
receive first image information of the subject captured under a first light environment condition and second image information of the subject captured under a second light environment condition that differs from the first light environment condition, wherein the first image information comprises a first pixel having a first pixel value, and the second image information comprises a second pixel having a second pixel value, the second pixel corresponding to the first pixel in the first image information;
determine a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and
determine a composite pixel value for the composite pixel of the composite image information based on the first pixel value, the second pixel value and the composition ratio function.

7. An image composition method for generating composite image information of a subject, the image composition method being executable by a computer and comprising:
receiving first image information of the subject captured under a first light environment condition and second image information of the subject captured under a second light environment condition that differs from the first light environment condition, wherein the first image information comprises a first pixel having a first pixel value, and the second image information comprises a second pixel having a second pixel value, the second pixel corresponding to the first pixel in the first image information;
determining a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and
determining a composite pixel value for the composite pixel of the composite image information based on the first pixel value, the second pixel value, and the composition ratio function.

8. A computer-readable recording medium having recorded thereon an image composition program for generating composite image information of a subject,
the image composition program being executable by a computer to:
receive first image information of the subject captured under a first light environment condition and second image information of the subject captured under a second light environment condition that differs from the first light environment condition, wherein the first image information comprises a first pixel associated with a first pixel value, and the second image information comprises a second pixel corresponding to the first pixel in the first image information;

determine a composition ratio function by weighting a first function with a second function, wherein the first function defines a relationship between the second pixel value and a composition ratio representing a proportion of the second pixel value to a composite pixel value of the composite image information, and the second function weights the first function to be increased when the second pixel value is greater than the first pixel value and to be decreased when the second pixel value is lesser than the first pixel value; and determine a composite pixel value for the composite pixel of the composite image information based on the first pixel value, the second pixel value, and the composition ratio function.

9. The image composition device according to claim 1, wherein the composite image information generated comprises automatically-adjusted image information associated with an automatically-adjusted image, and the at least one processor is further configured to:

generate unadjusted image information by compositing the first image information and the second image information received, the unadjusted image information being associated with an unadjusted image;

display the automatically-adjusted image and the unadjusted image on a display unit;

receive a selection by a user corresponding to one of the automatically-adjusted image and the unadjusted image; and record one of the automatically-adjusted image information and the unadjusted image information that is associated with the selection by the user, on a recording unit.

10. The image composition device according to claim 1, wherein the correcting comprises correcting a color temperature of the second image information to approach a color temperature of the first image information, and the composite image information comprises automatically-adjusted image information associated with an automatically-adjusted image, and wherein the at least one processor is further configured to:

generate unadjusted image information associated with an unadjusted image, by compositing the first image information and the second image information received; and generate a user-adjusted image information associated with a user-adjusted image, by:

receiving a user input comprising a target color temperature information;

correcting a color temperature of the second image information based on the target color temperature information; and compositing the first image information and the second image information having been corrected based on the user input; and display the unadjusted image and at least one of the automatically-adjusted image and the user-adjusted image on a display unit.

11. The image composition device according to claim 9, wherein the correcting for generating the automatically-adjusted image information comprises correcting a color temperature of the second image information to approach a color temperature of the first image information, and wherein the at least one processor is further configured to:

generate user-adjusted image information associated with a user-adjusted image, by:

receiving a user input comprising target color temperature information associated with a target color temperature;

correcting a color temperature of the second image information based on the target color temperature information;

compositing the first image information and the second image information having been corrected based on the user input; and displaying the unadjusted image and at least one of the automatically-adjusted image and the user-adjusted image on the display unit.

12. The image composition device according to claim 9, wherein the at least one processor is further configured to display a combined image on the display unit, wherein the combined image comprises a corrected part that is obtained from the automatically-adjusted image and a user-adjusted part that is obtained from the user-adjusted image, and the automatically-adjusted part and the user-adjusted part are adjacent to one another in the combined image and comprise a feature region which is divided by a boundary between the automatically-adjusted part and the user-adjusted part in the combined image.

13. The image composition device according to claim 11, further configured to display a combined image on the display unit, wherein the combined image comprises an unadjusted part obtained from the unadjusted image, and an adjusted part obtained from one of the automatically-adjusted image and the user-adjusted image, the unadjusted part being different from the adjusted part.

14. The image composition device according to claim 1, wherein the correcting comprises correcting a color temperature of the second image information to approach a color temperature of the first image information.

15. The image composition method according to claim 4, wherein in the correcting step, a color temperature of the second image information is corrected so as to approach a color temperature of the first image information.

16. The computer-readable recording medium according to claim 5, wherein the image composition program is further configured to:

in the correcting step, correct a color temperature of the second image information to approach a color temperature of the first image information.

17. The image composition device according to claim 1, wherein the at least one processor is further configured to correct the first image information wherein the first pixel value corresponds to a value of the first pixel having been corrected.

18. The image composition device according to claim 17, wherein the first image information comprises a first color temperature and the second image information comprises a second color temperature, the first image information is corrected to approach an intermediate color temperature defined between the first color temperature and the second color temperature, and the second image information is corrected to approach the intermediate color temperature.

19. The image composition method according to claim 4, further comprising correcting the first image information wherein the first pixel value corresponds to a value of the first pixel having been corrected.

20. The computer-readable recording medium according to claim 5, wherein the image composition program is further configured to correct the first image information wherein the first pixel value corresponds to a value of the first pixel having been corrected.

* * * * *